US011360502B2

(12) United States Patent
Dolan

(10) Patent No.: US 11,360,502 B2
(45) Date of Patent: Jun. 14, 2022

(54) SYSTEM CONTROLLER FOR CONTROLLING ELECTRICAL LOADS

(71) Applicant: Lutron Technology Company LLC, Coopersburg, PA (US)

(72) Inventor: David J. Dolan, Coopersburg, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 38 days.

(21) Appl. No.: 15/282,557

(22) Filed: Sep. 30, 2016

(65) Prior Publication Data

US 2017/0090499 A1 Mar. 30, 2017

Related U.S. Application Data

(60) Provisional application No. 62/234,981, filed on Sep. 30, 2015.

(51) Int. Cl.
*G05B 19/042* (2006.01)
*G05F 1/66* (2006.01)
*H05B 47/19* (2020.01)

(52) U.S. Cl.
CPC ............ *G05F 1/66* (2013.01); *G05B 19/042* (2013.01); *H05B 47/19* (2020.01); *G05B 2219/2642* (2013.01)

(58) Field of Classification Search
None
See application file for complete search history.

(56) References Cited

U.S. PATENT DOCUMENTS

| 5,248,919 | A  | 9/1993  | Hanna et al. |
| 5,848,054 | A  | 12/1998 | Mosebrook et al. |
| 5,905,442 | A  | 5/1999  | Mosebrook et al. |
| 5,982,103 | A  | 11/1999 | Mosebrook et al. |
| 6,803,728 | B2 | 10/2004 | Balasubramaniam et al. |
| 6,927,547 | B2 | 8/2005  | Walko, Jr. et al. |
| 7,126,291 | B2 | 10/2006 | Kruse et al. |
| 7,498,952 | B2 | 3/2009  | Newman, Jr. |
| 7,755,505 | B2 | 7/2010  | Johnson et al. |

(Continued)

*Primary Examiner* — Kenneth M Lo
*Assistant Examiner* — Istiaque Ahmed
(74) *Attorney, Agent, or Firm* — Condo Roccia Koptiw LLP

(57) ABSTRACT

A load control system may include control-target devices, control-source devices, and a system controller. The control-target devices may enter an association mode to associate with control-source devices. The control-target device may receive an identifier from the control-source device and store the identifier in memory when the control-target device to associate the control-target device and the control-source device. The system controller may retrieve the association information from the control-target device after integration into the load control system. The system controller may receive association information that is defined using other association procedures, such as an association procedure performed on a network device and uploaded to the system controller. The system controller may maintain the association information defined using the different association procedures after the system controller is integrated into the load control system. The system controller may also maintain control configuration information configured prior to integration of the system controller.

20 Claims, 10 Drawing Sheets

(56) References Cited

U.S. PATENT DOCUMENTS

| | | |
|---|---|---|
| 7,764,162 B2 | 7/2010 | Cash et al. |
| 7,880,639 B2 | 2/2011 | Courtney et al. |
| 8,009,042 B2 | 8/2011 | Steiner et al. |
| 8,199,010 B2 | 6/2012 | Sloan et al. |
| 8,228,184 B2 | 7/2012 | Blakeley et al. |
| 8,410,706 B2 | 4/2013 | Steiner et al. |
| 8,417,388 B2 | 4/2013 | Altonen et al. |
| 8,451,116 B2 | 5/2013 | Steiner et al. |
| 8,471,779 B2 | 6/2013 | Mosebrook |
| 8,598,978 B2 | 12/2013 | Knode |
| 8,779,905 B2 | 7/2014 | Courtney et al. |
| 8,823,268 B2 | 9/2014 | Saveri, III et al. |
| 2008/0092075 A1 | 4/2008 | Jacob et al. |
| 2008/0111491 A1 | 5/2008 | Spira |
| 2009/0206983 A1 | 8/2009 | Knode et al. |
| 2013/0026947 A1 | 1/2013 | Economy et al. |
| 2013/0030589 A1 | 1/2013 | Pessina et al. |
| 2013/0222122 A1* | 8/2013 | Killo ................. H05B 37/0227 340/12.22 |
| 2013/0344811 A1 | 12/2013 | Tolhuizen et al. |
| 2014/0001846 A1 | 1/2014 | Mosebrook et al. |
| 2014/0001977 A1 | 1/2014 | Zacharchuk et al. |
| 2014/0052783 A1 | 2/2014 | Swatsky et al. |
| 2014/0132475 A1 | 5/2014 | Bhutani et al. |
| 2014/0175875 A1 | 6/2014 | Newman, Jr. et al. |
| 2014/0177098 A1* | 6/2014 | Bruner ................. G06F 3/0605 360/110 |
| 2014/0177469 A1 | 6/2014 | Neyhart |
| 2014/0180487 A1 | 6/2014 | Bull |
| 2014/0247117 A1 | 9/2014 | Veskovic |
| 2014/0265568 A1* | 9/2014 | Crafts ...................... H02J 4/00 307/24 |
| 2014/0269222 A1 | 9/2014 | Patton et al. |
| 2014/0277805 A1 | 9/2014 | Browne, Jr. et al. |
| 2014/0354161 A1* | 12/2014 | Aggarwal .............. H05B 47/18 315/153 |
| 2015/0015377 A1 | 1/2015 | Bull et al. |
| 2015/0179058 A1 | 6/2015 | Crafts et al. |
| 2015/0185752 A1 | 7/2015 | Bard et al. |
| 2015/0220428 A1 | 8/2015 | Simonyi et al. |
| 2015/0295411 A1 | 10/2015 | Courtney et al. |
| 2016/0012715 A1* | 1/2016 | Raji .................. G06F 17/30873 340/506 |
| 2016/0164748 A1* | 6/2016 | Kim ...................... G06N 5/046 706/47 |
| 2016/0205745 A1 | 7/2016 | Saveri, III et al. |
| 2016/0261458 A1* | 9/2016 | Huang .................... H04L 43/16 |
| 2017/0046497 A1* | 2/2017 | Ramesh .............. G06F 19/3418 |

* cited by examiner

SYSTEM CONTROLLER FOR CONTROLLING ELECTRICAL LOADS

CROSS-REFERENCE TO RELATED APPLICATIONS

This application claims the benefit of U.S. Provisional Patent Application No. 62/234,981, filed Sep. 30, 2015, the entire disclosure of which is incorporated by reference herein.

BACKGROUND

A load control environment, such as a residence or an office building for example, may be configured with various types of load control systems. A lighting control system may be used to control the lighting loads in the user environment. A motorized window treatment control system may be used to control the natural light provided to the user environment. A heating, ventilation, and air-conditioning (HVAC) system may be used to control the temperature in the user environment.

Each load control system may include various control devices, including input devices and load control devices. The load control devices may receive digital messages from one or more of the input devices. The digital messages may include load control messages for controlling an electrical load. The load control devices may be capable of directly controlling the electrical load. The input devices may be capable of indirectly controlling the electrical load via the load control device by sending digital messages to the load control device that include control instructions for controlling the electrical load controlled by the load control device. Examples of load control devices may include lighting control devices (e.g., dimmer switches, electronic switches, ballasts, or light-emitting diode (LED) drivers), motorized window treatments, temperature control devices (e.g., thermostats), plug-in load control devices, and/or the like. Examples of input devices may include remote control devices, occupancy sensors, daylight sensors, temperature sensors, window sensors, and/or the like. To enable a load control device to recognize instructions received from an input device, the load control device and the input device may be associated with one another, such that the load control device may recognize the digital messages received from the input device.

FIG. 1 depicts a load control environment 102 in which input devices and load control devices may be installed and associated. As shown in FIG. 1, the load control environment 102 is a room in a building. The load control environment 102 includes load control devices that are capable of directly controlling an electrical load. For example, load control environment 102 includes a lighting control device 112. The lighting control device 112 may be a ballast, a light emitting diode (LED) driver, a dimmer switch, and/or the like. The lighting control device 112 is capable of directly controlling an amount of power provided to lighting load 114. Load control environment 102 includes additional load control devices, such as a motorized window treatment 116 for directly controlling the covering material 118 (e.g., via an electrical motor), a plug-in load control device 126 for directly controlling a floor lamp 128, a desk lamp, or other electrical load that may be plugged into the plug-in load control device 126, and/or a temperature control device 124 (e.g., thermostat) for directly controlling an HVAC system.

The input devices in load control environment 102 include a remote control device 122, an occupancy sensor 110, a daylight sensor 108, and a window sensor 120. The input devices may send digital messages to associated load control devices for indirectly controlling an electrical load by transmitting digital messages, such as load control messages, to the load control devices. The remote control device 122 may send digital messages for controlling a load control device upon actuation of one or more buttons. The occupancy sensor 110 may send digital messages to a load control device based on an occupancy or vacancy condition (e.g., movement or lack of movement) that is sensed within its observable area. The daylight sensor 108 may send digital messages to a load control device based on the detection of an amount of light within its observable area. The window sensor 120 may send digital messages to a load control device based on a measured level of light received from outside of the load control environment 102. For example, the window sensor 120 may detect when direct sunlight is directly shining into the window sensor 120, is reflected onto the window sensor 120, or is blocked by external means, such as clouds or a building, and may send a digital message indicating the measured light level.

The input devices and/or the load control devices may be in communication with a system controller 150. The system controller 150 is capable of transmitting digital messages to and/or receiving digital messages from control devices, such as input devices and load control devices. The digital messages may include association information for associating input devices and load control devices. The system controller 150 stores an association table of associated devices locally thereon. The system controller 150 controls the communication of digital messages from input devices to associated load control devices. Some control devices are capable of one-way communication, while other control devices are capable of two-way communication. The system controller 150 communicates with the control devices using the radio frequency (RF) signals 154.

The input devices in load control environment 102 may be associated with the load control devices using various association techniques. For example, in a first association procedure, the input devices may be associated with the load control devices by the user 142 actuating a button on the input device and the load control device. The actuation of the button on the input devices and the load control devices puts the input devices and the load control devices in an association mode for being associated with one another. In the association mode, the input devices transmit an association message to the load control devices. The association message from an input device may include a unique identifier of the input device that the load control devices store locally thereon, such that the load control devices are capable of recognizing subsequent digital messages from the input device that include load control instructions. The load control devices are capable of responding to the digital messages from the associated input device by controlling a corresponding electrical load according to the load control instructions received in the digital messages.

In a second association procedure, input devices and load control devices may be associated by the user 142 creating an association table at a computer 144. The association table includes a table that associates each load control device with input devices on the computer 144. The user 142 uploads the association table to the system controller 150. The system controller 150 then uploads the association information for each load control device in the association table to the load control device, such that the load control device may recognize digital messages from the associated input devices programmed by the user at the computer 144. The system controller 150 receives the association table from the computer 144 via WI-FI® signals 152.

The different association procedures for associating control devices are mutually exclusive. For example, if the user 142 attempts to associate devices in the load control environment using one association procedure (e.g., actuating buttons on the control devices) and then attempts to use a different association procedure (e.g., uploading associations from computing device 144 via system controller 150) to add other device associations into the load control system, the previously stored associations between the input devices and the load control devices will be lost or erased. The previously stored association information is lost or erased by the control device and/or the system controller 150 upon identifying another association procedure being performed. This causes previously associated devices to have to be re-associated when another association procedure is being used to add or change association information on a control device or at the system controller 150. Current association procedures fail to provide a convenient way to gather information for proper system configuration and association of control devices using different association procedures.

The input devices in the load control environment 102 may send control instructions to load control devices in a series of digital messages. For example, the remote control device 122 may transmit a series of digital message as the user 142 holds down a button or series of buttons to continue to control an electrical load. In another example, the occupancy sensor 110 may transmit a series of digital messages in response to an occupancy or vacancy condition. The series of digital messages may be sent to enable the control-target device to have a better chance of receiving the digital messages in the event of interference and/or to continue to iterate the control of an electrical load (e.g., continue to raise or lower the covering material 118, continue to raise or lower the dimming level of a lighting load 114, 128, continue to increase or decrease the temperature of the temperature control device 124, etc.). The load control devices may wait until the series of digital messages are fully received before controlling an electrical load, which may cause an unnecessary delay in the control of the electrical load.

SUMMARY

A load control system may include control-target devices, control-source devices, and a system controller. The control-target devices may enter an association mode to associate with control-source devices. The control-target devices may receive identifiers that identify the control-source device and store the identifiers in memory when the control-target devices are in the association mode to associate the control-target devices and the control-source devices.

The system controller may be integrated into the load control system after the association of control-source devices and control-target devices. The system controller may maintain the association of previously associated devices in the load control system and enable association of devices using different association procedures. The system controller may receive the association information stored on the control-target devices and maintain the association between the control-target devices and the control-source devices after the system controller is integrated into the load control system. The system controller may also receive the control configuration information stored on the control-target devices and maintain the control configuration information after the system controller is integrated into the load control system.

The system controller may receive association information and/or control configuration information from other devices, such as a network device, which may upload the association information and/or control configuration information according to a separate association procedure. The system controller may reconcile the association information and/or the control configuration information previously stored at control-target devices with the association information and/or the control configuration information uploaded to the system controller (e.g., from a network device in a separate association procedure). The system controller may maintain the association information between the control-target device and the control-source device after the system controller is integrated into the load control system. The system controller may enable association of control devices using various association procedures after being integrated into the load control system.

The control-source devices may send digital messages to control-target devices in series for controlling a respective electrical load. The digital messages may be sent in series to ensure a higher success rate of receipt of messages in case of interference. The digital messages may be sent in series to continue to control the electrical load with each digital message in the series. The system controller may identify a message in the series of digital messages being transmitted from the control-source device and preempt the series of digital messages at the control-target device. A preemption message may be sent to the control-target device to enable control of the electrical load prior to receiving the entire series of messages. The preemption message may also stop the continued change in the electrical load based on the other messages in the series. This may allow for more efficient control of electrical loads in the load control system.

DETAILED DESCRIPTION

A load control system for controlling power delivered from an AC power source to an electrical load may include control devices, such as control-target devices and control-source devices. The control-target devices may be responsive to messages (e.g., digital messages) transmitted by the control-source devices. The control-target device may be operable to enter an association mode to associate with at least one control-source device. The control-source device may be operable to send association information configured to associate the control-source device with the control-target device. For example, the control-source device may send an association message to the control-target device that includes association information, such as a unique identifier (e.g., serial number) of the control-source device for being stored on the control-target device. The control-target device may store the unique identifier of the control-source device and subsequently recognize digital messages received from the control-source device that may be transmitted to the control-target device for performing load control. The control-source devices may send control information (e.g., control instructions) to the associated control-target devices to control the electrical load of the control-target devices.

The load control system may include a system controller that may be operable to receive the association information and may maintain the association between the control-target device and the control-source device when the system controller is integrated into the load control system. The system controller may maintain the association between devices to enable control of the control-target devices by the associated control-source devices after integration of the system controller into the load control system. The system controller may facilitate communication of control information from control-source devices to associated control-target devices using the association information. Control-source devices and control-target devices may communicate control information and/or association information to each other directly prior to the integration of the system controller into the load control system. After the system controller is integrated into the load control system, the control-source devices and the control-target devices may communicate via the system controller. The system controller may be a gateway device, a network bridge device, an access point, and/or the like.

Figure 1:
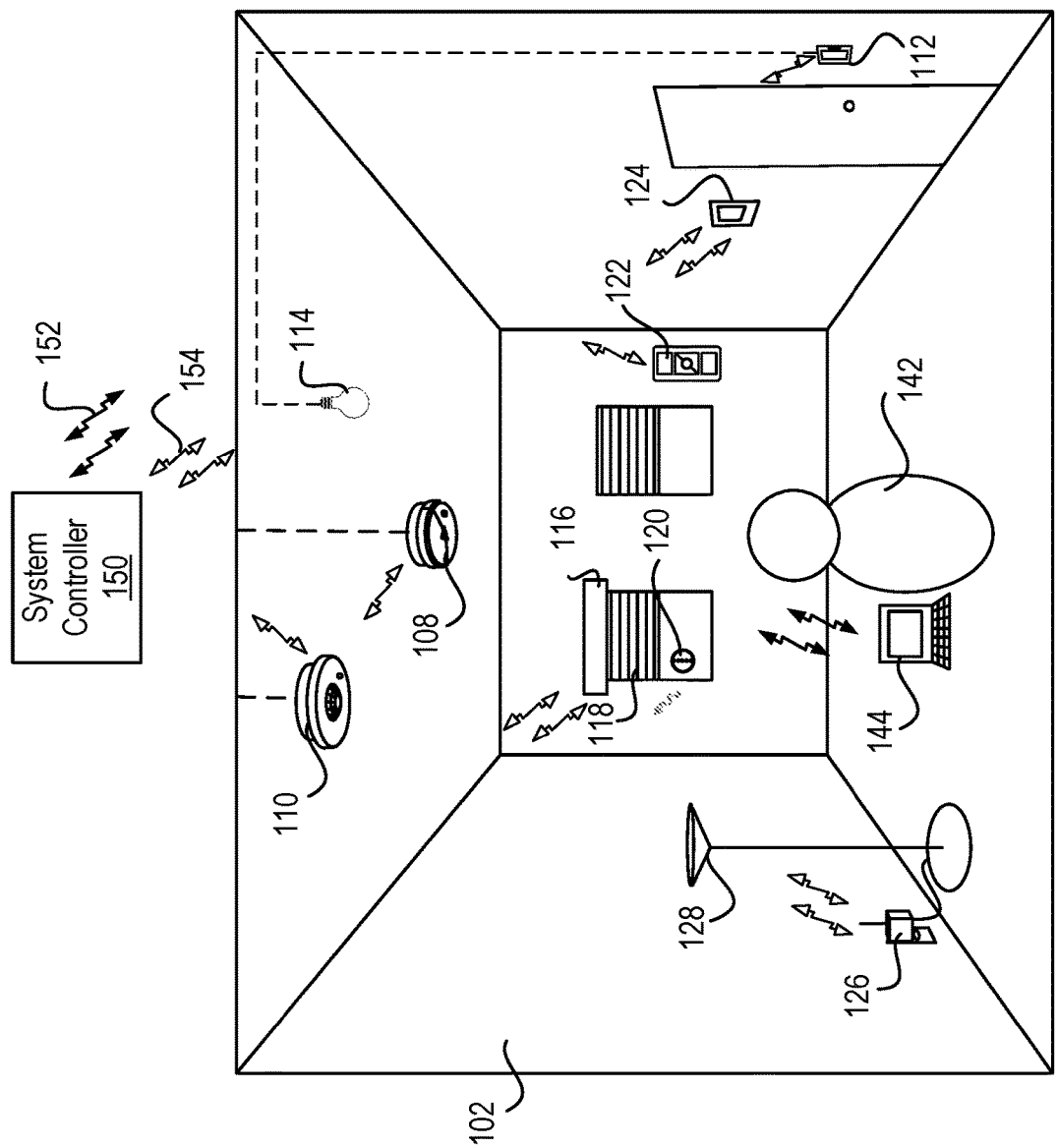
FIG. 1 is a system diagram that illustrates an example prior art load control environment for associating devices and controlling electrical loads.
Figure 2:
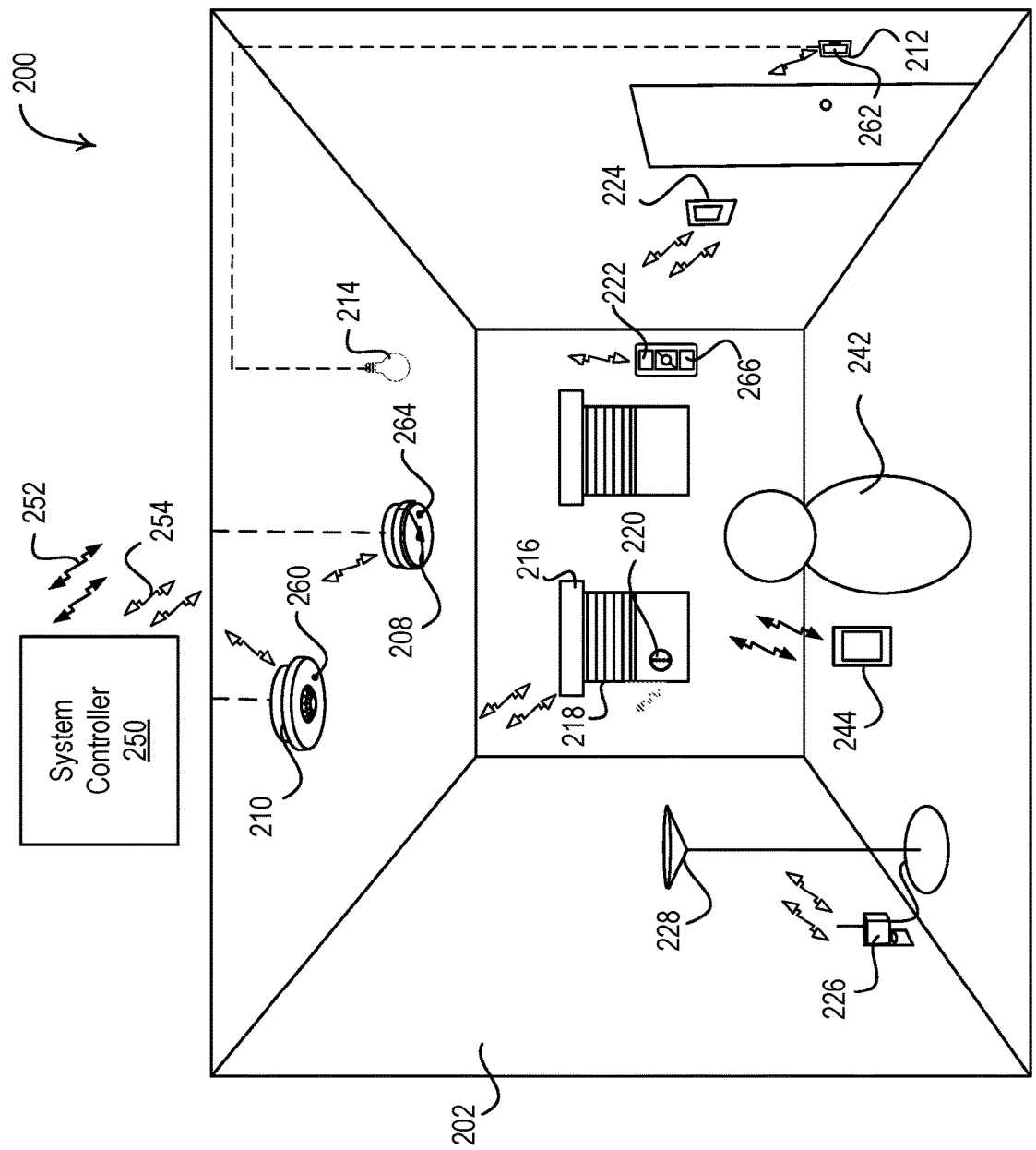
FIG. 2 is a system diagram that illustrates an example load control system for associating devices and controlling electrical loads.

FIG. 2 is a system diagram that illustrates an example load control system 200 for associating control devices and controlling electrical loads. The load control system 200 may include control-source devices and control-target devices. When a control-target device is associated with a control-source device, the control-target device may be responsive to the control-source device (e.g., responsive to digital messages transmitted by the control-source devices) for controlling an electrical load. A device may be both a control-target and a control-source device.

The control-target devices may be used for controlling (e.g., directly controlling) the electrical loads within a load control environment 202 in which the load control system 200 may be installed. For example, each control-target device may be electrically connected to (e.g., wired to) the respective electrical load for controlling (e.g., controlling the amount of power delivered to) the electrical load. Example control-target devices may include a lighting control device 212 (e.g., ballasts, LED drivers, dimmer switches, etc.) for controlling the amount of power provided to a lighting load 214 (e.g., lamp, LED, etc.), a motorized window treatment 216 having a motor drive unit (e.g., including a motor) for controlling the position of a covering material 218, a temperature control device 224 (e.g., a thermostat) for controlling an HVAC system, and/or a plug-in load control device 226 for controlling a plug-in electrical load, such as a floor lamp 228, a table lamp or another electrical device that is plugged in to the plug-in load control device 226. The control-target devices may be one-way communication devices or two-way communication devices capable of communicating digital messages to and/or receiving digital messages from other devices via wireless signals, e.g., radio-frequency (RF) communication signals 254.

Control-target devices may be put in an association mode for associating with other devices based on a button press. For example, upon receiving a selection of button 262, the lighting control device 212 may enter an association mode for associating itself with control-source devices. The other control-target devices may similarly be put in an association mode upon receiving an indication of a button press or upon receiving another indication to enter the association mode.

The control-source devices may indirectly control the amount of power provided to an electrical load by transmitting digital messages to the control-target devices that may directly control the electrical load. The digital messages may include control instructions, such as load control instructions, or another indication that causes the control-target device to determine load control instructions for controlling an electrical load. Example control-source devices may include a remote control device 222, an occupancy sensor 210, a daylight sensor 208, a window sensor 220, and/or a network device 244.

The remote control device 222 may transmit digital messages via the RF communication signals 254 in response to actuation of one or more buttons on the remote control device 222. The remote control device 222 may enter an association mode upon actuation of one or more buttons 266 and may transmit association messages to control-target devices during the association mode that include the unique identifier of the remote control device 222 for associating with control-target devices. The remote control device 222 may generate digital messages in response to actuation of one or more buttons that include control instructions for controlling an electrical load. The remote control device 222 may be attached to the wall (e.g., wall-mounted switch or wall-mounted dimmer) or detached from the wall. Examples of remote control devices are described in greater detail in U.S. Pat. No. 5,248,919, issued Sep. 28, 1993, entitled LIGHTING CONTROL DEVICE; U.S. Pat. No. 8,471,779, issued Jun. 25, 2013, entitled WIRELESS BATTERY-POWERED REMOTE CONTROL DEVICE WITH LABEL SERVING AS ANTENNA ELEMENT; and U.S. Patent Application Publication No. 2014/0132475, published May 15, 2014, entitled WIRELESS LOAD CONTROL DEVICE, the entire disclosures of which are hereby incorporated by reference.

The occupancy sensor 210 may be configured to detect occupancy and vacancy conditions in the space in which the load control system 200 is installed. The occupancy sensor 210 may transmit digital messages to control-target devices via the RF communication signals 254 in response to detecting the occupancy and/or vacancy conditions. The occupancy sensor 210 may operate as a vacancy sensor, such that digital messages are transmitted in response to detecting a vacancy condition (e.g., digital messages may not be transmitted in response to detecting an occupancy condition). The occupancy sensor 210 may enter an association mode and may transmit association messages via the RF communication signals 254 in response to actuation of a button 260 on the occupancy sensor 210. The association messages may include the unique identifier of the occupancy sensor 210 for associating with control-target devices, such that the control-target devices may respond to subsequent load control messages having the identifier. Examples of RF load control systems having occupancy and vacancy sensors are described in greater detail in commonly-assigned U.S. Pat. No. 8,009,042, issued Aug. 30, 2011, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The daylight sensor 208 may be configured to measure a total light intensity in the load control environment 202 in which the daylight sensor 208 is installed. The daylight sensor 208 may transmit digital messages including the measured light intensity via the RF communication signals 254 for controlling control-target devices in response to the measured light intensity. The daylight sensor 208 may enter an association mode and may transmit association messages via the RF communication signals 254 in response to actuation of a button 264 on the daylight sensor 208. The association messages may include the unique identifier of the daylight sensor 208 for associating with control-target devices, such that the control-target devices may respond to subsequent load control messages having the identifier. Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

The window sensor 220 may be configured to measure an exterior light intensity coming from outside the load control environment 202 in which the load control system 200 may be installed. The window sensor 220 may be mounted on a façade of a building, such as the exterior or interior of a window, to measure the exterior natural light intensity (which may be dependent upon the location of the sun in sky). The window sensor 220 may detect when direct sunlight is directly shining into the window sensor 220, is reflected onto the window sensor 220, or is blocked by external means, such as clouds or a building, and may send digital messages indicating the measured light intensity. The window sensor 220 may transmit digital messages including the measured light intensity to the system controller 250 and/or control-source devices via the RF communication signals 254. The digital messages may be used to control an electrical load via one or more control-target devices (such as motorized window treatments). The window sensor 220 may enter an association mode and may transmit association messages via the RF communication signals 254 in response to actuation of a button on the window sensor 220.

The network device 244 may be capable of performing wired and/or wireless communications. Examples of the network device 244 may include a wireless phone, a tablet, a laptop, a personal digital assistant (PDA), a wearable device (e.g., a watch, glasses, etc.), or another computing device. The network device 244 may communicate wirelessly by sending digital messages on RF communication signals 252 (e.g., WI-FI® signals, WI-MAX® signals, etc.). The RF communication signals 252 may be communicated on the same or different protocol and/or wireless band as the RF communication signals 254. For example, the RF communication signals 252 may be WI-FI® signals, while the RF communication signals 254 may be BLUETOOTH® signals or an RF signal transmitted on a proprietary protocol (e.g., a ClearConnect® protocol). The network device 244 may communicate digital messages in response to a user actuation of one or more buttons on the network device 244. Examples of load control systems having WI-FI®-enabled devices, such as smart phones and tablet devices, are described in greater detail in commonly-assigned U.S. Patent Application Publication No. 2013/0030589, published Jan. 31, 2013, entitled LOAD CONTROL DEVICE HAVING INTERNET CONNECTIVITY, and U.S. Patent Application Publication No. 2014/0177469, published Jun. 26, 2014, entitled NETWORK ACCESS COORDINATION OF LOAD CONTROL DEVICES, the entire disclosures of which are incorporated herein by reference.

The load control system 200 may include other types of control-source devices, such as, for example, temperature sensors, humidity sensors, radiometers, cloudy-day sensors, shadow sensors, pressure sensors, smoke detectors, carbon monoxide detectors, air-quality sensors, motion sensors, security sensors, proximity sensors, fixture sensors, partition sensors, keypads, multi-zone control units, slider control units, kinetic or solar-powered remote controls, key fobs, timeclocks, audio-visual controls, safety devices, power monitoring devices (e.g., power meters, energy meters, utility submeters, utility rate meters, etc.), central control transmitters, residential controllers, commercial controllers, industrial controllers, or any combination of control-source devices.

The control-target devices may be associated with control-source devices by the user 242 actuating a button on one or more of the control-target devices to put the control-target devices in an association mode. The association mode may enable the control-target devices to accept and/or request association messages from the control-source devices. The user 242 may actuate a button on one or more of the control-source devices to cause the control-source devices to enter an association mode and to transmit an association message to the control-target devices for being associated with the control-target devices that are in association mode. The control-source devices may include a unique identifier of the control-source device in the association messages for being stored at the control-target device. The control-source device may store association information defining the association between the control-source device and the control-target devices from which association messages were received while in the association mode. For example, the association information stored in the control-source device may be the unique identifiers of the control-target devices from which association messages were received while in the association mode. After exiting the association mode, the control-target devices may respond to digital messages from associated control-source devices for controlling the respective electrical loads according to the instructions in the digital messages.

The load control system 200 may include a system controller 250 operable to transmit and receive digital messages via wired and/or wireless communications. For example, the system controller 250 may be configured to transmit and receive the RF communication signals 254 to communicate with one or more wireless control devices (e.g., control-source devices and/or control-target devices). The system controller 250 may be coupled to one or more wired control devices (e.g., control-source devices and/or control-target devices) via a wired digital communication link. The system controller 250 may be on-site at the load control environment 202 or at a remote location. The system controller 250 may be a gateway device, a network bridge device, or an access point, for example. The system controller 250 may be integrated into the load control system 200 for maintaining association of control-source devices and control-target devices, while also allowing for additional association between control-source devices and control-target devices. The system controller 250 may be installed and/or configured after the control-source devices have been associated with the control-target devices of the load control system 200. The system controller 250 may also be installed and/or configured at the same time as the control-source devices and the control-target devices of the load control system 200.

Control-source devices and control-target devices may communicate control information and/or association information to each other directly prior to the integration of the system controller 250 into the load control system 200. After the system controller is integrated into the load control system, the control-source devices and the control-target devices may communicate control information and/or association information via the system controller 250. The system controller 250 may be configured to receive digital messages from the control-source devices and may transmit digital messages to the control-target devices in response to the digital messages received from the control-source devices. The digital messages may include association information for associating the control-source devices and the control-target devices. The digital messages may also include control instructions that may be used to control the electrical load of a control-target device (e.g., according to control configuration information). The system controller 250 may receive control instructions from a control-source device and may perform a lookup of the control-target devices associated with the control-source device. The system controller 250 may send digital messages that include control instructions to the associated control-target devices for controlling electrical loads.

The association information may be stored in the form of a table or database that associates a unique identifier (e.g., serial number) of a control-target device with a unique identifier (e.g., serial number) of one or more control-source devices. The association information may include a device type identifier that indicates a device type of the control-target device (e.g., lighting control device, motorized window treatment, plug-in load control device, temperature control device, etc.) and/or a device type of the control-source devices (e.g., remote control device, occupancy sensor, daylight sensor, window sensor, etc.).

The system controller 250 may store control configuration information according to which one or more control-target devices may be controlled. For example, control configuration information may include preset configurations. The system controller 250 may generate digital messages according to the preset configurations to set a dimming level of the lighting load 214 to a predefined level, to set a level of the covering material 218 to a predefined level, to set a dimming level of the lamp 228 to a predefined level, and/or to set a temperature of the temperature control device 224 to a predefined level. Different presets may be configured to control different control-target devices to control a corresponding electrical load differently. Example preset configurations may include bedtime preset for when a user is going to bed, a movie watching preset for when a user is watching television or a movie, an away preset for when a user is away from the building, a home preset for when the user is in the building, or other preset configurations a user may define for an occasion.

The control configuration information may include zone configurations. The zone configurations may define one or more zones in which a control-target device is defined for being controlled. The control-target devices in different zones may be separately controlled by sending digital messages having control instructions for controlling each zone. Different zones may be identified by a zone identifier that may be stored at the system controller 250 and/or the control-target devices in the zone.

The control configuration information may include occupancy configurations. The occupancy configurations may define one or more control-target devices for being controlled according to the occupancy or vacancy of a space. Different control-target devices may be controlled differently in response to occupancy commands and/or vacancy commands received from an occupancy sensor, such as the occupancy sensor 210. The system controller 250 may receive an occupancy or vacancy command in a digital message from the occupancy sensor 210 and may generate digital messages for controlling control-target devices in response to the occupancy or vacancy command.

The control configuration information may include timing schedule configurations. The timing schedule configurations may define a timing schedule for one or more control-target devices. Different control-target devices may be controlled in accordance with a timing schedule that may be monitored by the system controller 250. The system controller 250 may generate digital messages at the times identified by the timing schedule for controlling control-target devices.

The control configuration information may include mode configurations. For example, the control configuration information may include dimming modes that indicate different dimming levels for the lighting load 214 and/or the lamp 228 in response to digital messages. The control configuration information may include switching modes that indicate different dimming levels for the lighting load 214 and/or the lamp 228 in response to a switch. The control configuration information may include high end and low end trims.

A user 242 may use the network device 244 to configure the load control system 200, for example, at the same time (or after) the system controller 250 is integrated into the load control system. The network device 244 may communicate with the system controller 250 via wired and/or wireless communication. The network device 244 may communicate with the system controller 250 using digital messages transmitted via RF communication signals 252 (e.g., WI-FI® signals, WI-MAX® signals, etc.) to allow the network device 244 to associate control devices (e.g., control-source devices and control-target devices) and/or control electrical loads. The network device 244 may generate an application locally for displaying information received from the system controller 250 and/or receiving user input for communicating information to the system controller 250. The system controller 250 may be accessed from the network device 244 via a web interface (e.g., accessible via a web browser or other application at the network device 244). For example, if the system controller 250 is being installed and/or configured after the control-source devices have been associated with the control-target devices, the user 242 may use the network device 244 to bring the previously-associated control devices into the system.

If the system controller 250 is being installed and/or configured at the same time as the control-source devices and the control-target devices, the user 242 may use the network device 244 to associate one or more control-source devices with one or more control-target devices. The system controller 250 and/or the network device 244 may generate and store association information (e.g., defining the association between the control-source devices and control-target devices). The association information may be sent from the network device 244 to the system controller 250, which may store the association information. The system controller 250 may identify the association information corresponding to each control-target device using the unique identifier of the control-target device and unique identifiers of the corresponding associated devices (e.g., unique identifiers of the control-source devices). The system controller 250 may transmit the association information for each control-target device to the respective control-target device for storage thereon. The system controller 250 may also identify other information, such as control configuration information, corresponding each control-target device and may transmit the information to each control-target device for storage thereon, such that the control-target devices may respond according to the information. The control-target devices may also be associated with control-source devices by the user 242 actuating a button on the control-target devices to put the control-target devices in an association mode after the system controller 250 is integrated into the load control system.

The system controller 250 may control the association between control devices in the load control system 200. The actuation of the button on the control-target devices may cause the control-target devices to communicate an association message to the system controller 250. The system controller 250 may listen for the association messages from control-source devices for being associated with the control-target devices from which the association message was received. The system controller 250 may associate the control-target device with the control-source devices and store the association information locally. The system controller 250 may receive digital messages from control-source devices and may use the association information to identify the associated control-target devices. The system controller 250 may send digital messages that include control instructions for controlling the associated control-target devices. The system controller 250 may also, or alternatively, communicate the association information for each of the control-target devices to the devices themselves for being stored thereon, such that the control-target devices may identify the digital messages from associated control-source devices and respond accordingly to control an electrical load.

The system controller 250 may be integrated into the load control system 200 after control-source devices and control-target devices have been associated, for example. The network device 244 may connect to the system controller 250 for adding control devices (e.g., control-source devices and/or control target devices) to the system controller 250. The network device 244 may access the system controller 250 to identify control devices and upload association information from the identified control devices to the system controller 250. For example, the network device 244 may connect to the system controller 250 and put system controller 250 in an association mode for identifying control-source devices and/or control-target devices in the load control system 200. The user 242 may put the system controller 250 in an association mode by actuation of a button on the network device 244 to cause the network device 244 to transmit an association message to the system controller 250 to put the system controller 250 in an association mode. The user 242 may put the system controller 250 in an association mode by actuation of a button on the system controller 250 itself.

The user 242 may actuate a button to put a control-target device in an association mode while the system controller 250 is in association mode. The system controller 250 may identify the control-target device that has been put in the association mode. For example, the control-target device may transmit an association message upon actuation of the button on the control-target device and the system controller 250 may identify the device from the association message. The system controller 250 may receive digital messages from control devices and/or send digital messages to control devices via the RF communication signals 254. The association message may include a unique identifier of the control-target device and/or a device type that indicates that the device is a control-target device. The system controller 250 may store the unique identifier of the control-target device as an identified control-target device in the load control system 200.

The system controller 250 may query the identified control-target devices to retrieve association information and/or control configuration information stored at the control-target devices. The query may be sent while the system controller 250 and/or the control-target devices are in association mode. The query may be submitted in response to a user actuation of a button at the network device 244. The query may be submitted in response to the association message identifying the control-target device. The system controller 250 may store the association information and/or the control configuration information for the identified control-target devices.

The system controller 250 may receive association information and/or control configuration information from the network device 244. For example, the user 242 may configure association information and/or control configuration information at the network device 244 and upload the association information and/or control configuration information to the system controller 250 (e.g., upon actuation of a button at the network device 244). The association information and/or control configuration information may include a unique identifier of a control-target device or a set of unique identifiers for a group of control-target devices (e.g., devices in a defined zone configuration) for which association information and/or control configuration information is being uploaded. The system controller 250 may store the association information and/or the control configuration information. The association information and/or the control configuration information uploaded to the system controller 250 from the network device 244, or portions thereof, may be duplicative of the association information and/or the control configuration information received from control-target devices. The association information and/or the control configuration information uploaded to the system controller 250 from the network device 244, or portions thereof, may be inconsistent with the association information and/or the control configuration information received from control-target devices. For example, the control configuration information may be inconsistent where the same command (e.g., from a control-source device or time event) would cause different control instructions to be communicated to the control-target device for controlling an electrical load. The association information may be inconsistent where the control-source devices associated with the same control-target device (e.g., unique identifier of the same control-target device) are different.

The system controller 250 may reconcile association information and/or control configuration information that is received from the control-target devices and the network device 244. For example, the system controller 250 may merge the association information and/or control configuration information that is received from the control-target devices and the network device 244. The system controller 250 may identify the unique identifier of each control-target device in the information received from the control-target devices and the network device 244 to determine whether the unique identifier is duplicated in the information. Where the unique identifier of a control-target device is identified in the information received from the control-target devices and the network device 244, the system controller 250 may create an aggregate list of association information and an aggregate set of control configuration information for the control-target device.

The system controller 250 may create an aggregate list of association information for a control-target device by aggregating the unique identifiers of the control-source devices associated with the control-target device in the association information received form the control-target device and the network device 244. The system controller 250 may add the unique identifiers of the control-source device identified in the information received from the control-target devices to the control-source devices identified in the information received from the network device 244. Where a unique identifier of a control-source device is duplicated (e.g., is identified in the information received from the control-target devices and the network device 244), the duplicate identifiers of the control-source devices may be deleted.

The system controller 250 may aggregate the control configuration information for each of the control-target devices identified in the information received from the control-target devices and the network device 244 by aggregating the control configuration information for the control-target device that is received from the control-target device and the control configuration information for the control-target device that is received form the network device 244. Where control configuration information for a control-target device is inconsistent or duplicative, the system controller 250 may choose to store the control configuration information from the control-target device or the control configuration information from the network device 244 and delete the control configuration information from the other device. In another example, the system controller 250 may delete control configuration information from both the control-target device and the network device 244 when the control configuration information is inconsistent or duplicative for an identified control-target device. The system controller 250 may send a message to the user via the network device 244 to allow the user to choose the control configuration information for the system controller 250 to maintain and receive a response from the network device 244. The system controller 250 may receive changes to the control configuration information that may be input by the user at the network device 250. The control configuration information may be inconsistent where the same command (e.g., from a control-source device or time event) would cause different control instructions to be communicated to the control-target device for controlling an electrical load. For example, control configuration information configured before integration of the system controller 250 may be identified as being inconsistent with control-configuration information received from another control-target device or the network device 244 after integration of the system controller 250. The system controller 250 may remove the control configuration information previously configured on the control-target device and upload the stored control configuration information thereon. This control configuration information may include updated control configuration information received from the network device after integration of the system controller 250 and/or information that is consolidated at the system controller 250 from multiple control-target devices.

The system controller 250 may identify and/or remove unsupported devices in the load control system 200. Unsupported devices may include devices that may be unrecognized by the system controller 250 for performing association and/or load control in the load control system 200. The system controller 250 may identify unsupported devices by a unique identifier and/or a device type identifier (e.g., remote control device, daylight sensor, occupancy sensor, radio-window sensor, etc.). The device type identifier may be stored in the association information. The system controller 250 may identify unsupported devices in the association information and may delete the unsupported devices from the association information stored at the system controller 250. In an example, the system controller 250 may identify occupancy sensors as being unsupported devices and may remove occupancy sensors from the association information stored for the control-target devices. The system controller 250 may send a digital message to the network device 244 that includes a notification for being displayed to a user to indicate that unsupported devices have been found in the association information. The notification may identify the unsupported device by name, a unique identifier, and/or a device type identifier.

The system controller 250 may limit the number of devices in the load control system 200 with which the system controller 250 may communicate (e.g., fifty devices or less). The number of devices may include control-target devices, control-source devices, and/or system controllers. The system controller 250 may detect when the number of devices being stored at the system controller 250 exceeds the number of possible devices. The system controller 250 may automatically delete a number of control-target devices and/or the associated control-source devices from the association information when the number of devices in the association information exceeds the number of devices with which the system controller 250 may communicate. The system controller 250 may prevent the limit on the number of possible devices from being exceeded. The devices to be deleted may be based on device type, such that certain types of devices are deleted before other types of devices. The number of associated control-source devices may be limited for each control-target device to limit the number of supported devices. Different types of control-target devices may have different limits for the number of associated control-source devices.

The system controller 250 may provide a number of options to the network device 244 for preventing the number of supported devices from being exceeded. The options may be displayed for user selection at the network device 244. For example, the system controller 250 may allow the user to associate none of the devices in the received association information or associate a subset of the devices (e.g., the control-target devices and delete the control-source devices or vice versa). The system controller 250 may delete control-target devices of an identified device type according to priority. The system controller 250 may allow the user 242 to delete control-target devices and/or associated control-source devices by selecting the control devices on the network device 244. The system controller 250 may send a digital message to the network device 244 that includes a notification for being displayed to a user to indicate that the number of devices in the load control system 200 that are supported by the system controller 250 is exceeded. The network device 244 may prompt the user for deleting the number of devices in the association information that is stored at the system controller 250. The network device 244 may also, or alternatively, provide the user 242 with an option to discontinue use of the association information and/or configuration information at the system controller 250 when the number of devices in the load control system 200 that are supported for being associated and/or controlled by the system controller 250 is exceeded.

The system controller 250 may download association information and/or control configuration information to the control-target devices. For example, the system controller 250 may reconcile the association information and/or control configuration information from a control-target device and the network device 244 and may download the reconciled association information and/or control configuration information to the control-target devices. The reconciled association information and/or control configuration information may be sent to the control-target devices while the control-target devices are in the association mode. The system controller 250 may send a digital message to the control-target devices that instructs the control-target devices to delete the stored association information and/or control configuration information from memory and to store the association information and/or control configuration information sent from the system controller 250.

The instruction to delete the stored information and to store the information sent from the system controller 250 may be transmitted from the system controller 250 (e.g., via the RF communication signals 254) upon receiving the response to the query for association information and/or control configuration information stored at a control-target device. In another example, the instruction to delete the stored information and to store the information sent from the system controller 250 may be transmitted from the system controller 250 as an update message, which may be broadcast to the control-target devices. Each control-target device may identify the association information and/or control configuration information corresponding to the control-target device (e.g., by identifying the unique identifier of the control-target device) and may store the association information and/or control configuration information corresponding to the control-target device.

The instruction to delete the stored information and to store the information sent from the system controller 250 may be transmitted from the system controller 250 (e.g., via the RF communication signals 254) upon receiving the association information and/or control configuration information from the network device 244. The system controller 250 may update the control-target devices for which association information and/or control configuration information is received. For example, the system controller 250 may send an instruction to identified control-target devices (e.g., identified control-target devices for which updated association information and/or control configuration information is received from the network device 244) to delete the stored information and to store the information sent from the system controller 250. The association information and/or control configuration information may be transmitted from the system controller 250 as an update message, which may be broadcast to the identified control-target devices. Each control-target device may identify the association information and/or control configuration information corresponding to the control-target device (e.g., by identifying the unique identifier of the control-target device) and may store the association information and/or control configuration information corresponding to the control-target device.

The association information and/or control configuration information for a control-target device may be unchanged at the system controller 250 after being reconciled. For example, the information uploaded from the network device 244 may be the same as the information stored at the control-target device. In another example, one of the network device 244 or the control-target device may lack association information and/or control configuration information thereon. For example, some control-target devices may be unresponsive to a request for association information and/or control configuration information when queried by the system controller. The network device 244 may not upload association information and/or control configuration information for some control-target devices. The system controller 250 may still proceed with instructing the control-target devices (e.g., the control-target devices from which information is received or the control-target devices identified in the information uploaded from the network device) to delete the stored association information and/or control configuration information from memory and to store the association information and/or control configuration information sent from the system controller 250.

The system controller 250 may rearrange the association information and/or control configuration information before uploading the information to control-target devices. For example, the system controller 250 may rearrange the association information and/or the control configuration information to be uploaded to the control-target devices in the order in which the information is stored at the system controller 250 before uploading the information to control-target devices. The control-target devices may store associated devices in the order in which they are associated (e.g., prior to the integration of the system controller 250). The system controller 250 may have predefined indexes with which device types (e.g., occupancy sensors, remote control devices, daylight sensors, etc.) and/or control information may be stored, which may cause the system controller 250 to rearrange the order of the information stored at one or more control-target devices. The order of the devices stored at the system controller 250 may be based on the order in which the device identifiers are received from one or more control-target devices and/or the network device 244. For example, the system controller 250 may receive association information, or partial association information indicating a subset of devices, from one or more control-target devices, then receive association information, or partial association information indicating a subset of devices, from the network device 244, or vice versa. The system controller 250 may generate a uniform list (e.g., database) of association information and/or control configuration information for being communicated to multiple control-target devices. The system controller 250 may receive the same association information and/or control configuration information from multiple control-target devices, but in a different order or format, and upload the information to the control-target devices in a uniform format. This may create a uniform configuration of the system across devices.

While the system controller 250 is maintaining the previous association information and/or the control information, control devices may be installed and/or configured within the load control system 200. For example, control-source devices and control-target devices may be associated using various association techniques. A control-source device may be installed and may be associated with a control-target device for performing communications. The association may be performed by the user 242 actuating a button on the control-target device to put the control-target device in association mode. The control-target device may transmit an association message upon entering the association mode that may be identified by the system controller 250. The association message may include the unique identifier of the control-target device and/or a device type, such that the system controller 250 may identify the device that is in association mode.

The system controller 250 may listen for association messages from control-source devices for being associated with the control-target device in response to receiving the association message from the control-target device. The user 242 may actuate buttons on the control-source devices to trigger transmission of association messages from the control-source devices to associate the control-source devices with the control-target device. The control-target device may receive the association messages from the control-source devices for performing association with the control-source devices. When the system controller 250 is installed and implemented in the load control system 200, the system controller 250 may hear the association messages from the control-source devices and may independently associate the control-source devices with the control-target device at the system controller 250. The system controller 250 may continue to receive the association messages from additional control-source devices and may continue to associate the control-source devices with the control-target device at the system controller 250. The system controller 250 may send the association information to the control-target devices for being stored thereon.

Control-source devices may create multiple associations for different button groups on the device for performing control. A different identifier may be sent from the remote control device when different buttons are selected for a group. The control-source device may send a different association message for the button groups. Multiple association messages may be sent to the system controller 250. Each message prior to the last message may indicate that there are more messages to be transmitted by the control-source device. The control-target devices may remain in association mode until the control-target devices receive the last message.

The system controller 250 independently listening for association messages and associating control devices may provide for more efficient network communications in the load control system 200. For example, the system controller 250 independently listening for association messages and associating control devices may prevent the system controller 250 from sending subsequent requests (e.g., queries) for association information to the control-target devices to update the association information at the system controller 250.

The user 242 may configure association information and/or control configuration information for control devices at the network device 244. The network device 244 may access the association information stored at the system controller 250. The user 242 may disassociate previously associated devices and/or associated identified devices by making selections on the network device 244. The user 242 may access the control configuration information stored at the system controller 250. The user 242 may edit currently stored control configuration information and/or generate control configuration information for being implemented at identified control-target devices.

The network device 244 may transmit the association information and/or control configuration information to the system controller 250 (e.g., upon actuation of a button by the user 242). The system controller 250 may transmit the association information and/or control configuration information to the control-target devices to update the association information and/or control configuration information stored at the control-target devices. The system controller 250 may broadcast the updated association information and/or control configuration information to the control-target devices for the control-target devices to identify updated corresponding association information and/or control configuration information, if any, for being stored locally thereon.

The system controller 250 may listen for digital messages from control-source devices that include control information for controlling associated control-target devices. The system controller 250 may receive digital messages that include control instructions from control-source devices and may determine (e.g., using the unique identifier of the control-source device) the control-target devices associated with the control-source devices from which the digital messages are received. The system controller 250 may identify how each of the associated control-target devices would respond to the control instructions in the digital messages (e.g., based on the control configuration information stored at the system controller 250). The system controller 250 may track the status (e.g., dimming level of lighting load 214 or lighting load 228, level of covering material 218 controlled by the motorized window treatment 216, temperature of the temperature control device 224, etc.) of the control-target devices by listening to the digital messages being transmitted to the control-target devices.

The system controller 250 may track the status of the control-target devices from an initial status that may be received in response to the query to the control-target devices. The system controller 250 may track the status of the control-target devices from periodic status messages that may be received from the control-target devices (e.g., in response to a status request from the system controller 250 or at periodic time intervals).

The system controller 250 independently listening for digital messages that include control information for controlling control-target devices may provide for more efficient network communications in the load control system 200. For example, the system controller 250 independently listening for digital messages that include control information and determining the status of associated control-target devices based on the digital messages may prevent the system controller 250 from sending requests for status information to the control-target devices to update the status information that may be maintained at the system controller 250.

The system controller 250 may preempt digital messages from control-source devices to control-target devices that include control information for controlling associated control-target devices. The control-source devices may send communications that include a series of digital messages for controlling the control-target device. For example, the remote control device 222 may transmit a series of digital message as the user holds down a button or series of buttons to continue to control an electrical load. In another example, the occupancy sensor 210 may transmit a series of digital messages in response to an occupancy or vacancy condition. The series of digital messages may be sent to enable the control-target device to have a better chance of receiving the digital messages in the event of interference and/or to continue to iterate the control of an electrical load (e.g., continue to raise or lower the covering material 218, continue to raise or lower the dimming level of a lighting load 214, 228, continue to increase or decrease the temperature of the temperature control device 224, etc.). The system controller 250 may send a preemption message to the control-target devices associated with a control-source device to preempt the series of digital messages for controlling the control-target device. The preemption message may cause the control-target devices to stop listening to the messages currently being received from the control-source device for performing control. The preemption message may be sent from the system controller 250 in response to receipt of one or more messages prior to the last message in the series of messages.

The preemption message may also, or alternatively, be sent from the system controller 250 in response to a digital message from a control-source device (e.g., the control-source device that is transmitting the series of messages or another control-source device) requesting that the system controller 250 preempt the communications being transmitted to associated control-target devices. In another example, the control-target devices may automatically preempt the series of messages (e.g., received from a control-source device or the system controller) by responding to the first message received in the series without waiting for the last message in the series or the end of a timeout period. The preemption message may allow for greater efficiency in communications within the system, as the system controller 250 and/or the control-target devices may perform communications prior to the series of messages being completed.

The control-target devices may wait until the series of digital messages are partially or fully received before controlling an electrical load, or the control-target devices may respond to the first message received in the series and continue to control the electrical load iteratively over the series of digital messages (e.g., continue to raise or lower the covering material 218, continue to raise or lower the dimming level of a lighting load 214, 228, continue to increase or decrease the temperature of the temperature control device 224, etc.). If the control-target device waits until the series of digital messages are partially or fully received before controlling the electrical load, the control-target device may prevent control of the electrical load according to the series of digital messages when the preemption message is received before the final message in the series. If the control-target device is continuing to control the electrical load iteratively over the series of digital messages, the control-target device may stop controlling the electrical load upon receipt of the preemption message and ignore subsequent messages in the series. The control-target device may store the status (e.g., dimming level of lighting load 214 or lighting load 228, level of covering material 218 controlled by the motorized window treatment 216, temperature of the temperature control device 224, etc.) of the control-target devices prior to implementing the instructions in the series of digital messages, such that if the control-target device receives the preemption message after controlling the electrical load, the control-target device may revert back to the prior status.

The control-target devices may also respond to the first digital message in the series of digital messages, instead of waiting for the series of digital messages to be completed for a quicker response turnaround. For example, the control-target devices themselves may preempt the series of digital messages being communicated from a control-source device and may respond to the first digital message in the series.

The control-target devices preempting the series of digital messages from a control-source device may reduce latency in the load control system 200. The response time for control-target devices may be reduced to a fraction of the original response time (e.g., where the series of digital messages may take 1.8 seconds to transmit before the control-target device may respond may be reduced to 150 milliseconds).

The system controller 250 may be integrated into an out-of-the-box system. For example, the system controller 250 may have a predefined number of devices identified in memory. The system controller 250 may include a predefined number of control-target devices in storage, for example, with the association information and/or control configuration information for the control-target devices also being stored in memory. The system controller 250 may be installed in the load control system 200 with the predefined devices. The system controller 250 may upload the association information and/or control configuration information for the predefined devices to the control-target devices (e.g., the control-target devices previously installed in the load control system 200). The system controller 250 may allow for the predefined devices to be associated with other devices installed (e.g., previously or subsequently installed) in the load control system 200. The system controller 250 may be installed in the load control system 200 and may be able to communicate associated devices stored thereon that may be installed (e.g., previously or subsequently) in the load control system 200.

Though the system controller 250 is shown as a single devices in FIG. 2, the system controller 250, or the functionality thereof, may be distributed across multiple devices. For example, the system controller 250 may communicate with an access point, a network bridge, or other network communication device. The system controller 250 and the other device may communicate via the RF communication signals 252 and/or may communicate via a wired communication.

Figure 3:
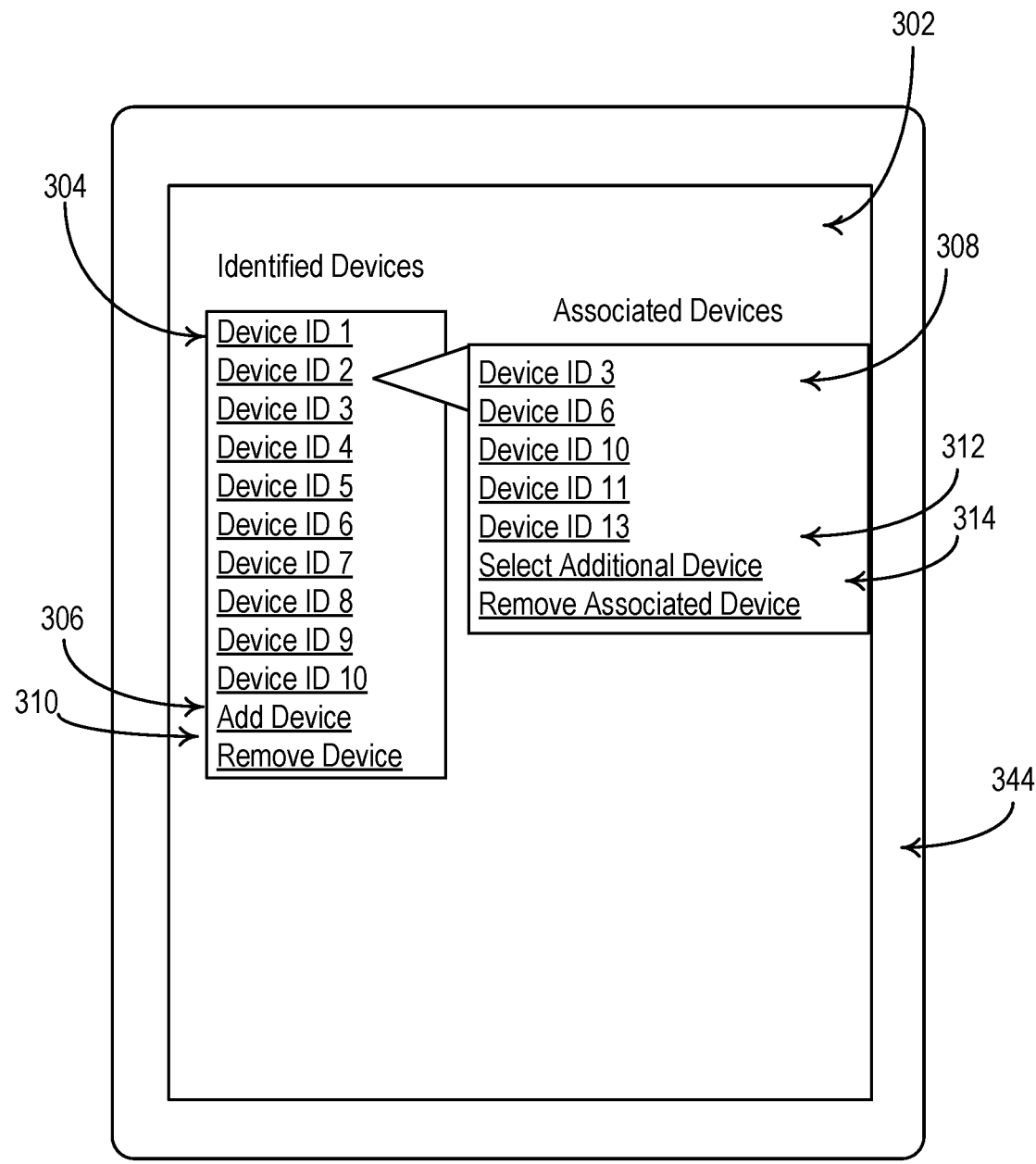
FIG. 3 illustrates an example graphical user interface (GUI) that may be implemented for associating control devices.

FIG. 3 illustrates an example graphical user interface (GUI) 302 that may be implemented for associating control devices. The GUI 302 may be displayed on a display of the network device 344. The GUI 302 may allow a user to view and/or adjust association information stored on a system controller, such as the system controller 250 shown in FIG. 2.

The GUI 302 may display a list of devices 304 that are identified in a load control system. The list of devices 304 may include control-source devices and/or control-target devices. The list of devices 304 may represent the list of devices identified by the system controller (e.g., via association).

The user may add and/or remove devices from the list of devices 304. For example, the user may actuate a button 306 to identify a control-target device and add the control-target device to the list of devices 304. The actuation of the button 306 may send an association message to the system controller to trigger an association mode for identifying devices at the system controller. The user may actuate a button at a control-target device for transmitting an association message from the control-target device to the system controller. The association message may identify the control-target device and the unique identifier of the control-target device may be added to the list of devices 304. The user may actuate a button at a control-source device for transmitting an association message from the control-source device to the system controller. The association message may identify the control-source device and the unique identifier of the control-source device may be added to the list of devices 304.

The user may actuate a button 310 to remove a device from the load control system, as well. For example, a user may actuate the button 310 to remove unsupported devices or devices when the number of identified devices 304 exceeds the number of supported devices for a system controller. The actuation of the button 310 may trigger a digital message from the network device 344 that causes the system controller to delete the identified device (e.g., unique identifier) from memory. A user selection of a device identifier or device identifiers in the list of devices 304 may be received prior to, or after, the selection of the button 310 to remove the identified device.

A user may select a device from the list of devices 304 in the load control system to view the devices associated with the selected device. For example, in FIG. 3, a control-target device with a unique identifier of "Device ID 2" is selected, and a list of associated control-source devices 308 is displayed. The list of associated control-source devices 308 indicates that the control-target device with the unique identifier "Device ID 2" is associated with control-source devices having unique identifiers "Device ID 3," "Device ID 6," "Device ID 10," "Device ID 11," and "Device ID 13." Similarly, if a control-source device is selected from the list of devices 304, the associated control-target devices may be displayed. The network device 344 may allow a user to name the control devices that have been identified, such that the user can recognize the control devices by name. The control-target devices and/or the associated control-source devices may be named by the network device 344. The control-target devices and/or the associated control-source devices may be uploaded from other devices (e.g., the control-target devices or the system controller) after integration of the system controller or otherwise identified by the system controller for being associated with other control devices.

The user may actuate a button 312 to associate a device with the selected control-target device and add the associated device to the association information at the system controller. By actuating the button 312, the user may be presented with a list of control-source devices that are associated with other identified control-target devices in the list of devices 304, or the user may select a control-source device from the list of devices 304. The user may select a control-source device for being associated with the identified control-target device and the network device 344 may upload the updated association information to the system controller for storage thereon.

A user may remove devices from the list of associated devices 308 by actuating the button 314. The user may select the device in the list of associated devices 308 for being removed. The network device 344 may send a digital message to the system controller instructing the system controller to delete the unique identifier of the selected device in the list of associated devices 308 from the association information for the identified control-target device. A user selection of a device identifier or device identifiers in the list of associated devices 308 may be received prior to, or after, the selection of the button 310 to remove the identified device.

Figure 4:
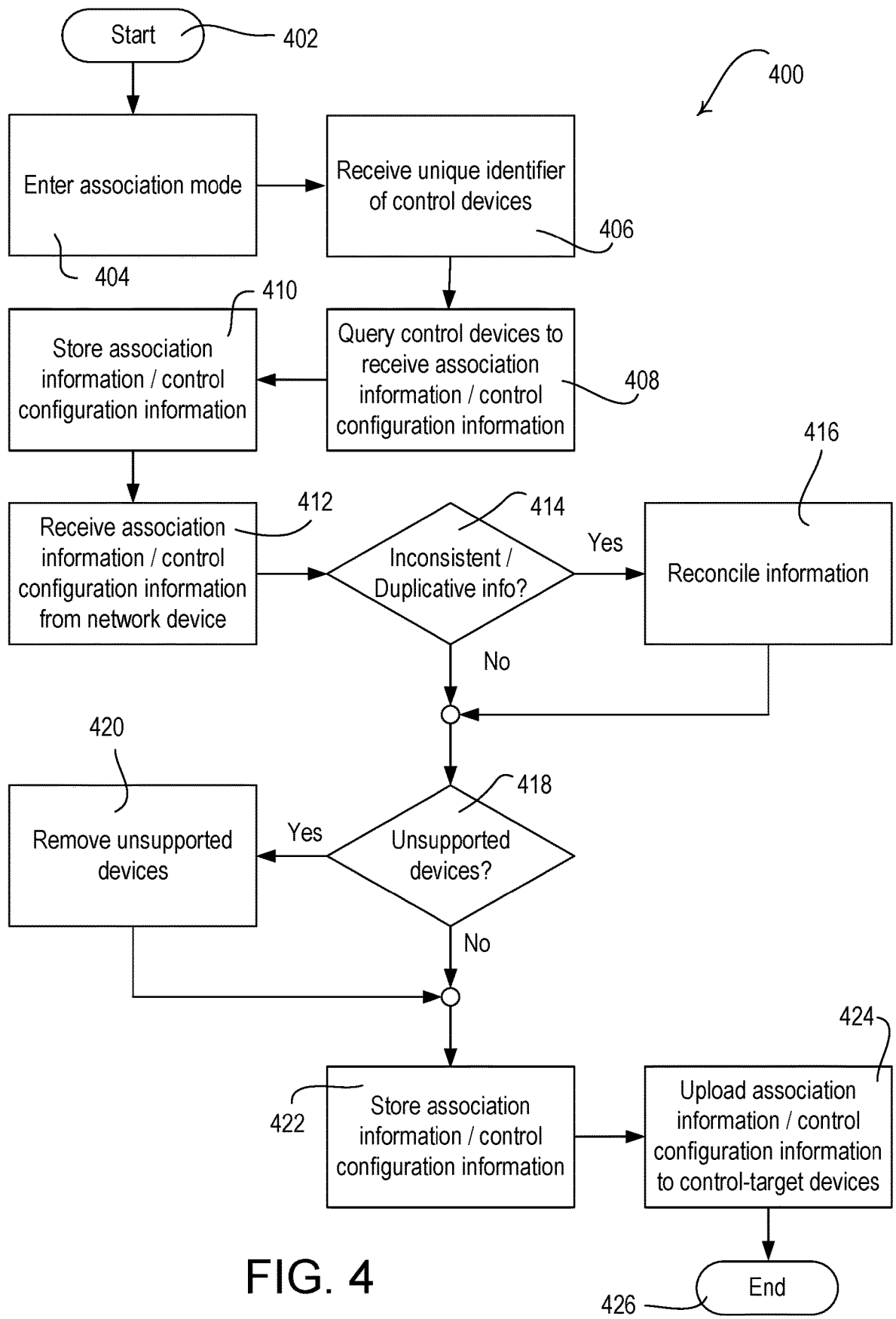
FIG. 4 is a flow diagram of an example method that may be implemented for configuring association information and/or control configuration information at devices in a load control system.

FIG. 4 is a flow diagram of an example method 400 that may be implemented for configuring association information and/or control configuration information at devices in a load control system. The method 400 may be implemented at one or more devices. For example, the method 400, or portions thereof, may be implemented at a system controller or a group of system controllers. In another example, the method 400, or portions thereof, may be distributed across the system controller, a control-target device, a network device, or a combination thereof.

The method 400 may begin at 402. At 404, an association mode may be entered. For example, the system controller may enter an association mode after being implemented in a load control system. During the association mode, unique identifiers of control devices may be received at 406. The unique identifiers may be received from control-source devices and/or control target devices. At 408, control devices may be queried to receive association information and/or control configuration information stored at the control devices. For example, the system controller may query control-target devices and/or control-source devices to receive the association information and/or control configuration information stored thereon. Devices may be unresponsive to the query, such as where association information and/or control configuration information being requested is absent thereon. The association information and/or control configuration information received in response to the query may be stored at 410.

Association information and/or control configuration information may be received from the network device at 412. For example, the network device may upload the association information and/or control configuration information to the system controller at 412. A determination may be made, at 414, as to whether there exists inconsistent or duplicative information between the information received from the control devices at 408 and the information received from the network device at 412. For example, the control configuration information may be inconsistent where the same command (e.g., from a control-source device or time event) would cause different control instructions to be communicated to the control-target device for controlling an electrical load. The association information may be inconsistent where the control-source devices associated with the same control-target device (e.g., unique identifier of the same control-target device) are different.

If there is inconsistent or duplicative information identified at 414, the association information and/or control configuration information that is received from the control devices and the network device may be reconciled at 416. For example, the association information and/or the control configuration information that is received from the control devices may be merged with the association information and/or the control configuration information that is received from the network device. The unique identifier of each control device in the information received from the control devices may be compared with the unique identifier of the control devices in the information received from the network device to determine whether the unique identifier is duplicated in the information. Where the unique identifier of a control-target device is identified in the information received from the control devices and the network device, an aggregate list of association information and an aggregate set of control configuration information may be created for the control device. An aggregate list of association information for a control-target device may be created by aggregating the unique identifiers of the control-source devices associated with the control-target device in the association information received form the control-target device and the network device. Where a unique identifier of a control-source device is duplicated (e.g., is identified in the information received from the control-target devices and the network device), the duplicate identifiers of the control-source devices may be deleted.

The control configuration information may be aggregated for each of the control-target devices identified in the information received from the control devices and the network device by aggregating the control configuration information for the control-target device that is received from the control devices and the control configuration information for the control-target device that is received form the network device. Where control configuration information for a control-target device is inconsistent or duplicative, the control configuration information from the control devices or the control configuration information from the network device may be stored and the control configuration information from the other device may be deleted. In another example, the control configuration information from both the control devices and the network device may be deleted when the control configuration information is inconsistent or duplicative for an identified control-target device. The user may choose the control configuration information to be maintained on the network device.

At 418, a determination may be made as to whether there exist any unsupported devices in the association information. Unsupported devices may include devices that may be unrecognized by the system controller for performing load control in the load control system. The unsupported devices may be identified by a unique identifier and/or a device type identifier (e.g., remote control device, daylight sensor, occupancy sensor, radio-window sensor, etc.). Certain types of devices may be unsupported in the load control system. The unsupported devices may be control-target devices and/or control-source devices. The unsupported devices may be capable of being associated directly with other devices in the load control system, but may be unsupported by the system controller. For example, a control-source device may be associated with a control-target device directly prior to the integration of the system controller into the load control system. After the system controller is integrated into the load control system, the associated control-source device may be unsupported by the system controller for communicating digital messages to the control-target device via the system controller. Different types of control-source and/or control-target devices may be unsupported by the system controller. The device type identifier may be stored in the association information.

The unsupported devices may be identified in the association information and may be removed from the association information, at 420. For example, the system controller may delete the unsupported devices from the association information. In an example, the system controller may identify occupancy sensors as being unsupported devices and may remove occupancy sensors from the association information stored for communicating with the control-target devices. A digital message may be sent to the network device that triggers a notification for being displayed to a user to indicate that unsupported devices have been found in the association information. The notification may identify the unsupported device by name, a unique identifier, and/or a device type identifier.

The association information and/or the control configuration information may be stored at 422. The association information and/or the control configuration information stored at 422 may be the information processed at 416 to reconcile the inconsistent or duplicative information. The association information and/or the control configuration information stored at 422 may be the information processed at 420 to remove the unsupported devices. The association information and/or the control configuration information may go unprocessed at 416 and/or 418 and may be similar to the information received from the control devices and/or the network device.

The association information and/or the control configuration information may be stored, at 422, in an updated format. For example, the association information and/or the control configuration information may be formatted according to predefined indexes according to device types (e.g., occupancy sensors, remote control devices, daylight sensors, etc.). The control-target devices may store the associated devices in an order of association, which may be uploaded to the system controller. The system controller may receive the information from multiple control-target devices (e.g., of a similar type) and generate a uniform list (e.g., database) of association information and/or control configuration information for being communicated to multiple control-target devices. The association information and/or control configuration information may be uploaded to the control-target devices at 424. The system controller may receive the same association information and/or control configuration information from multiple control-target devices, but in a different order or format, and upload the information to the control-target devices in a uniform format. The method 400 may end at 426.

Figure 5:
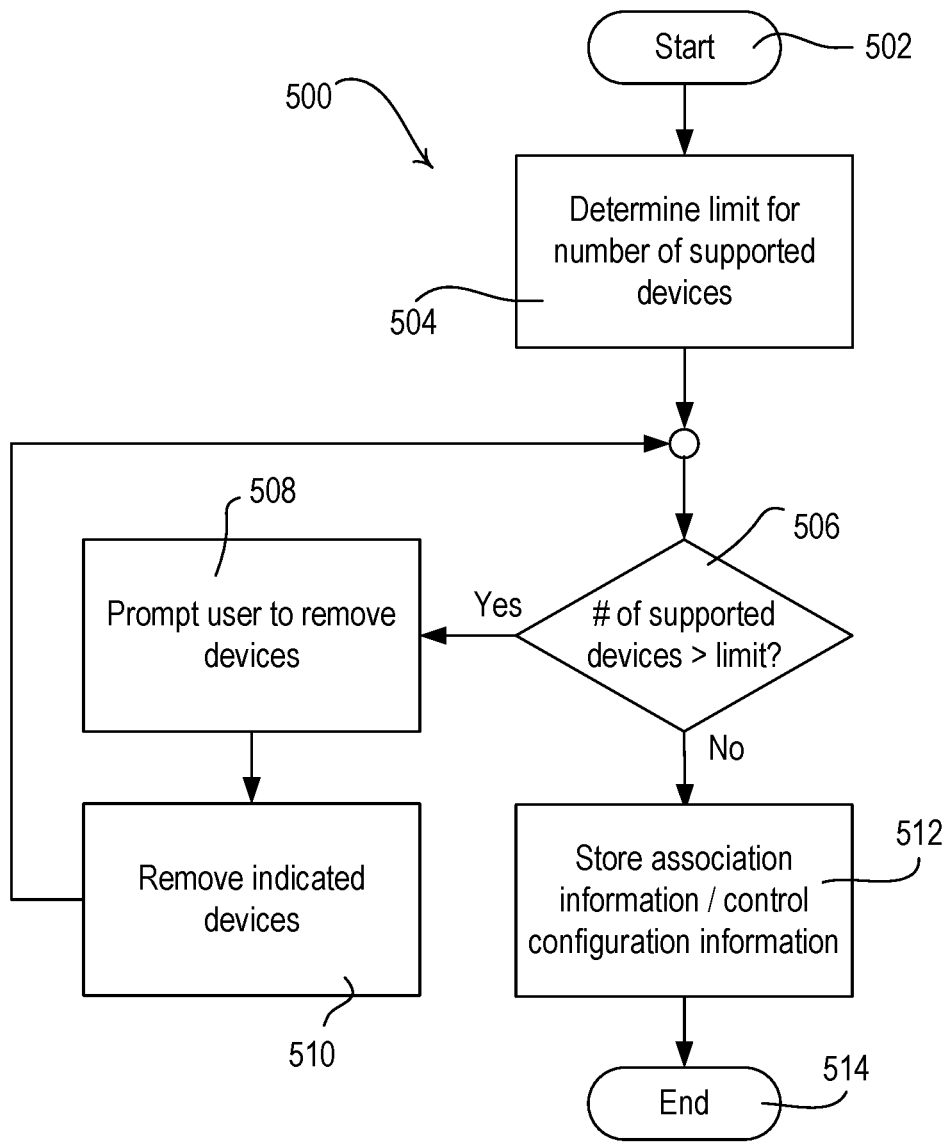
FIG. 5 is a flow diagram of an example method that may be implemented for configuring devices in a load control system.

FIG. 5 is a flow diagram of an example method 500 that may be implemented for configuring devices in a load control system. The method 500 may be implemented at one or more devices. For example, the method 500, or portions thereof, may be implemented at a system controller or a group of system controllers. In another example, the method 500, or portions thereof, may be distributed across the system controller, a control-target device, a network device, or a combination thereof.

The method 500 may begin at 502. At 504, a limit for the number of supported devices may be determined. The number of supported devices in the load control system may be limited by device type or in total. For example, the number of lighting control devices may be limited to a different number than the number of motorized window treatments. The number of supported devices may be preprogrammed or received via user input. In an example, fifty devices or less may be supported by each system controller in the load control system. The number of supported devices may include control-target devices, control-source devices, system controllers, or any combination thereof.

At 506, a determination may be made as to whether the number of devices being stored exceeds the limit on the number of supported devices. For example, when the system controller receives association information from one or more control devices, and/or association information from the network device, the system controller may determine whether the number of devices exceeds the limit on the number of supported devices. If the number of devices exceeds the limit on the number of supported devices, the user may be prompted to remove devices at 508. The system controller may send a digital message to the network device to prompt the user to remove devices from the association information. The prompt may indicate recommended devices and/or device types for being removed from the association information. An indication of the devices to be removed from the association information may be received (e.g., in response to user selection) and the indicated devices may be removed at 510. The associated devices and/or the control configuration information for each of the indicated devices may also be removed from memory. In another example, the system controller may automatically delete a number of control-target devices and/or the associated control-source devices from the association information when the number of devices in the association information exceeds the limit on the number of supported devices.

The method 500 may return to 506 to determine whether the number of devices in the association information still exceeds the limit. If the number of supported devices in the association information is at the limit, or less than the limit, the association information may be stored at 512 for enabling digital messages to be recognized by associated devices within the load control system. For example, the association information may be stored at the system controller and/or the control-target devices for enabling the recognition of the control-target devices to be controlled in response to digital messages received from associated control-source devices. The control configuration information for each of the devices may be stored in memory at 512. The method 500 may end at 514.

Figure 6:
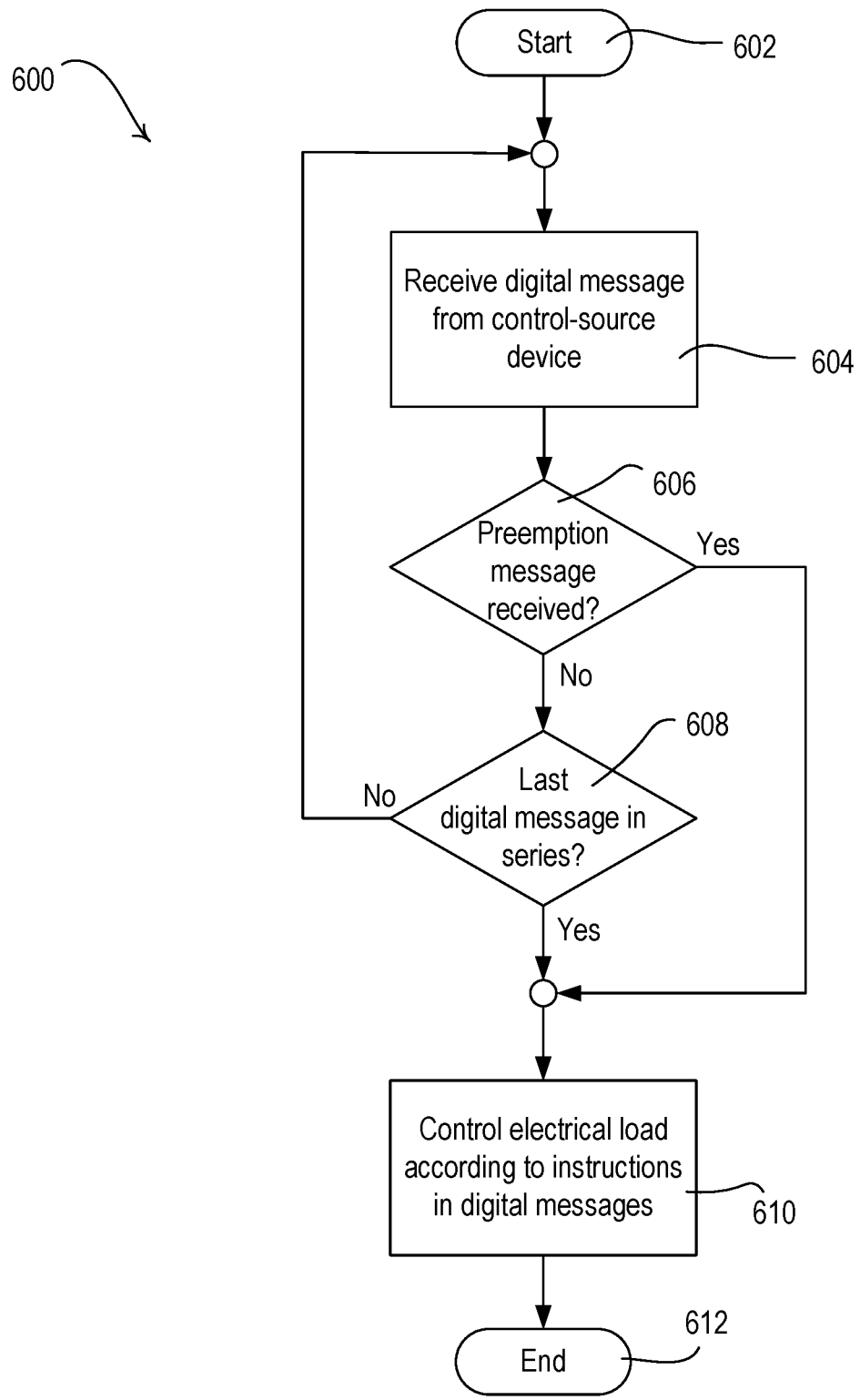
FIG. 6 is a flow diagram of an example method that may be implemented for communicating digital messages in a load control system.

FIG. 6 is a flow diagram of an example method 600 that may be implemented for communicating digital messages in a load control system. The method 600 may be implemented at one or more devices. For example, the method 600, or portions thereof, may be implemented at a control-target device. In another example, the method 500, or portions thereof, may be distributed across the system controller, a control-target device, a network device, or a combination thereof.

The method 600 may begin at 602. At 604, a digital message may be received from a control-source device. The digital message may be received at a control-target device. The system controller may receive the digital message transmitted from the control-source device to the control-target device and transmit the digital message to the control-target device, or retain the status of the electrical load based on the digital message from the control-source device. The digital message received at 604 may be one of a series of digital messages transmitted by the control-source device for controlling the control-target device. The series of digital messages may be sent to enable the control-target device to have a better chance of receiving the digital messages in the event of interference.

At 606, a determination may be made as to whether a preemption message is received. The preemption message may be sent from the system controller (e.g., after hearing one or more digital messages from the control-source device) to expedite control of the electrical load. For example, the control-target device may wait until the receipt of the last digital message in a sequence, or until a digital message is unreceived for a period of time, to implement control of the electrical load based on the messages. The preemption message may enable a more immediate implementation of the control of the electrical load.

If the preemption message is determined to be received at 606, the control-target device may control the electrical load according to the instructions in the digital message at 610. If the preemption message is unreceived at 606, a determination may be made at 608 as to whether the digital message received at 604 was the last message in a series of messages from the control-source device. The messages may include a series indicator that indicates whether the digital message is a last message in the series. The indicator may be a bit indicator that is set to a different value for the last message of the series. The indicator may be a value that indicates the message number of the digital message in the series.

If the digital message received at 604 is determined at 608 to be a message other than the last message in the series, the method 600 may return to 604 to receive another digital message in the series. If the digital message received at 604 is determined at 608 to be the last message in the series, the electrical load may be controlled according to the instructions in the digital messages at 610. The method 600 may end at 612.

The method 600 may enable control-target devices to respond to digital message in a series of digital messages that are received earlier (e.g., the first received digital message), instead of waiting for the series of digital messages to be completed. The control-target devices preempting the series of digital messages from a control-source device may reduce latency in the load control system. The response time for control-target devices may be reduced to a fraction of the original response time. For example, where the series of digital messages may take 1.8 seconds to transmit before the control-target device may respond, whereas the preemption of the series of messages may enable the response time to be reduced to 150 milliseconds or less.

Figure 7:
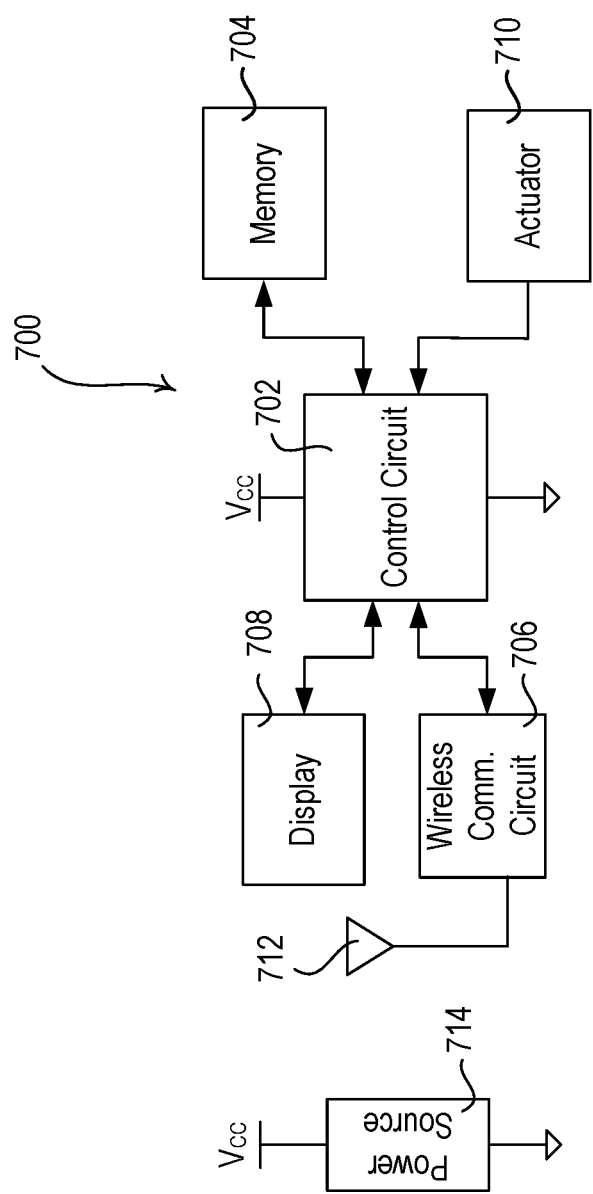
FIG. 7 is a block diagram illustrating an example network device.

FIG. 7 is a block diagram illustrating an example network device 700 (e.g., the network device 244 of FIG. 2) as described herein. The network device 700 may include a control circuit 702 for controlling the functionality of the network device 700. The control circuit 702 may include one or more general purpose processors, special purpose processors, conventional processors, digital signal processors (DSPs), microprocessors, integrated circuits, a programmable logic device (PLD), application specific integrated circuits (ASICs), and/or the like. The control circuit 702 may perform signal coding, data processing, power control, image processing, input/output processing, and/or any other functionality that enables the network device 700 to perform as described herein.

The control circuit 702 may store information in and/or retrieve information from the memory 704. The memory 704 may include a non-removable memory and/or a removable memory. The non-removable memory may include random-access memory (RAM), read-only memory (ROM), a hard disk, and/or any other type of non-removable memory storage. The removable memory may include a subscriber identity module (SIM) card, a memory stick, a memory card (e.g., a digital camera memory card), and/or any other type of removable memory. The control circuit 702 may access the memory 704 for executable instructions and/or other information that may be used by the network device 700.

The network device 700 may include a wireless communication circuit 706 for wirelessly transmitting and/or receiving information. For example, the wireless communications circuit 706 may include an RF transceiver for transmitting and receiving RF communication signals (e.g., network communication signals) via an antenna 712, or other communications module capable of performing wireless communications. Wireless communications circuit 706 may be in communication with the control circuit 702 for communicating information to and/or from the control circuit 702. For example, the wireless communication circuit 706 may send information from the control circuit 702 via network communication signals (e.g., WI-FI® signals, WI-MAX® signals, cellular, BLUETOOTH®, etc.). The wireless communication circuit 706 may send information to the control circuit 702 that is received via network communication signals.

The control circuit 702 may also be in communication with a display 708. The display may provide information to a user in the form of a graphical and/or textual display. The communication between the display 708 and the control circuit 702 may be a two way communication, as the display 708 may include a touch screen module capable of receiving information from a user and providing such information to the control circuit 702.

The network device 700 may include an actuator 710. The control circuit 702 may be responsive to the actuator 710 for receiving a user input. For example, the control circuit 702 may be operable to receive a button press from a user on the network device 700 for making a selection or performing other functionality on the network device 700.

Each of the modules within the network device 700 may be powered by a power source 714. The power source 714 may include an AC power supply or DC power supply, for example. The power source 714 may generate a DC supply voltage $V_{CC}$ for powering the modules within the network device 700.

Figure 8:
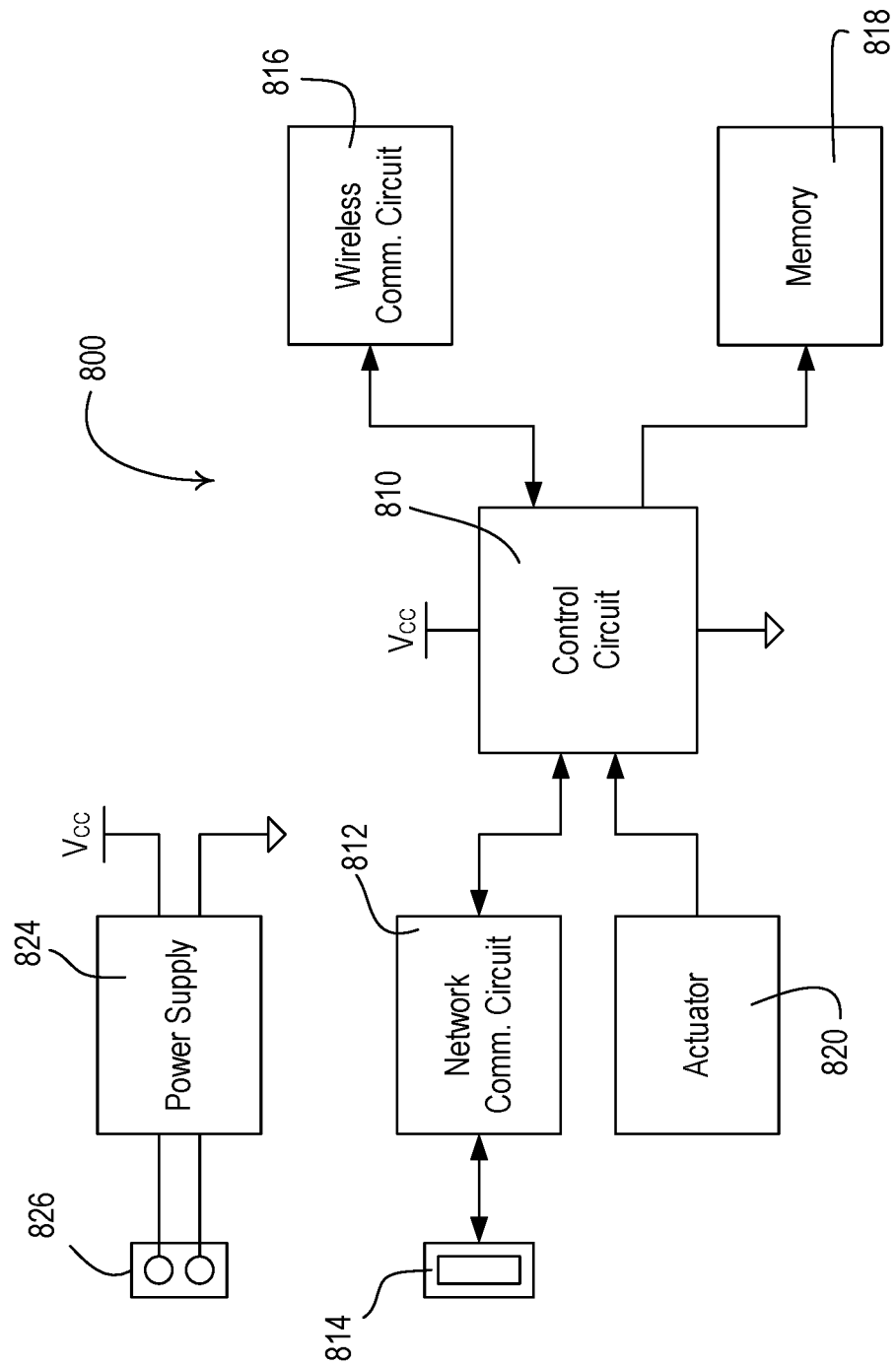
FIG. 8 is a block diagram illustrating an example system controller.

FIG. 8 is a block diagram of an example system controller 800 (e.g., the system controller 250 of FIG. 2). The system controller 800 may comprise a control circuit 810, which may include one or more of a processor (e.g., a microprocessor), a microcontroller, a programmable logic device (PLD), a field programmable gate array (FPGA), an application specific integrated circuit (ASIC), or any suitable processing device. The control circuit 810 may perform signal coding, data processing, image processing, power control, input/output processing, and/or any other functionality that enables the system controller 800 to perform as described herein. The system controller 800 may comprise a network communication circuit 812 that may be coupled to a network connector 814 (e.g., an Ethernet jack), which may be adapted to be connected to a wired digital communication link (e.g., an Ethernet communication link) for allowing the control circuit 810 to communicate on a network. In an example, the network connector 814 may be connected to a network communication device (e.g., access point, router, modem, bridge, etc.). The network communication circuit 812 may be configured to be wirelessly connected to the network, e.g., using Wi-Fi technology to transmit and/or receive network communication signals. For example, the network communication circuit 812 may be configured to wirelessly communicate via network communication signals (e.g., WI-FI® signals, WI-MAX® signals, cellular signals, BLUETOOTH® signals, etc.). The control circuit 810 may be coupled to the network communication circuit 812 for transmitting digital messages via the network communication signals.

The system controller 800 may comprise a wireless communication circuit 816. The wireless communication circuit 816 may include an RF transceiver coupled to an antenna for transmitting and/or receiving RF communication signals. The wireless communication circuit 816 may communicate using the same or different protocol and/or wireless band as the network communication circuit 812. For example, the wireless communication circuit 816 may communicate using BLUETOOTH® or a proprietary protocol (e.g., the ClearConnect® protocol), while the network communication circuit 812 communicates using WI-FI® signals, WI-MAX® signals, cellular signals, etc. The control circuit 810 may be coupled to the wireless communication circuit 816 for transmitting and/or receiving digital messages via the RF communication signals. The control circuit 810 may be configured to send digital message to and/or receive digital messages from control devices (e.g., control-target devices and/or control-source devices).

The control circuit 810 may be responsive to an actuator 820 for receiving a user input. For example, the control circuit 810 may be operable to associate the system controller 800 with one or more devices of a load control system in response to actuations of the actuator 820. The system controller 800 may comprise additional actuators to which the control circuit 810 may be responsive.

The control circuit 810 may store information in and/or retrieve information from the memory 818. The memory 818 may include a non-removable memory and/or a removable memory for storing computer-readable media. The non-removable memory may include random-access memory (RAM), read-only memory (ROM), a hard disk, and/or any other type of non-removable memory storage. The removable memory may include a subscriber identity module (SIM) card, a memory stick, a memory card (e.g., a digital camera memory card), and/or any other type of removable memory. The control circuit 810 may access the memory 818 for executable instructions and/or other information that may be used by the system controller 800. The control circuit 810 may store the association information and/or control configuration information in the memory 818. The control circuit 810 may access instructions in the memory 818 for transmitting instructions and/or performing other functions described herein.

The system controller 800 may comprise a power supply 824 for generating a DC supply voltage $V_{CC}$ for powering the control circuit 810, the network communication circuit 812, the wireless communication circuit 816, the memory 518, and/or other circuitry of the system controller 800. The power supply 824 may be coupled to a power supply connector 826 (e.g., a USB port) for receiving a supply voltage (e.g., a DC voltage) and/or for drawing current from an external power source.

Figure 9:
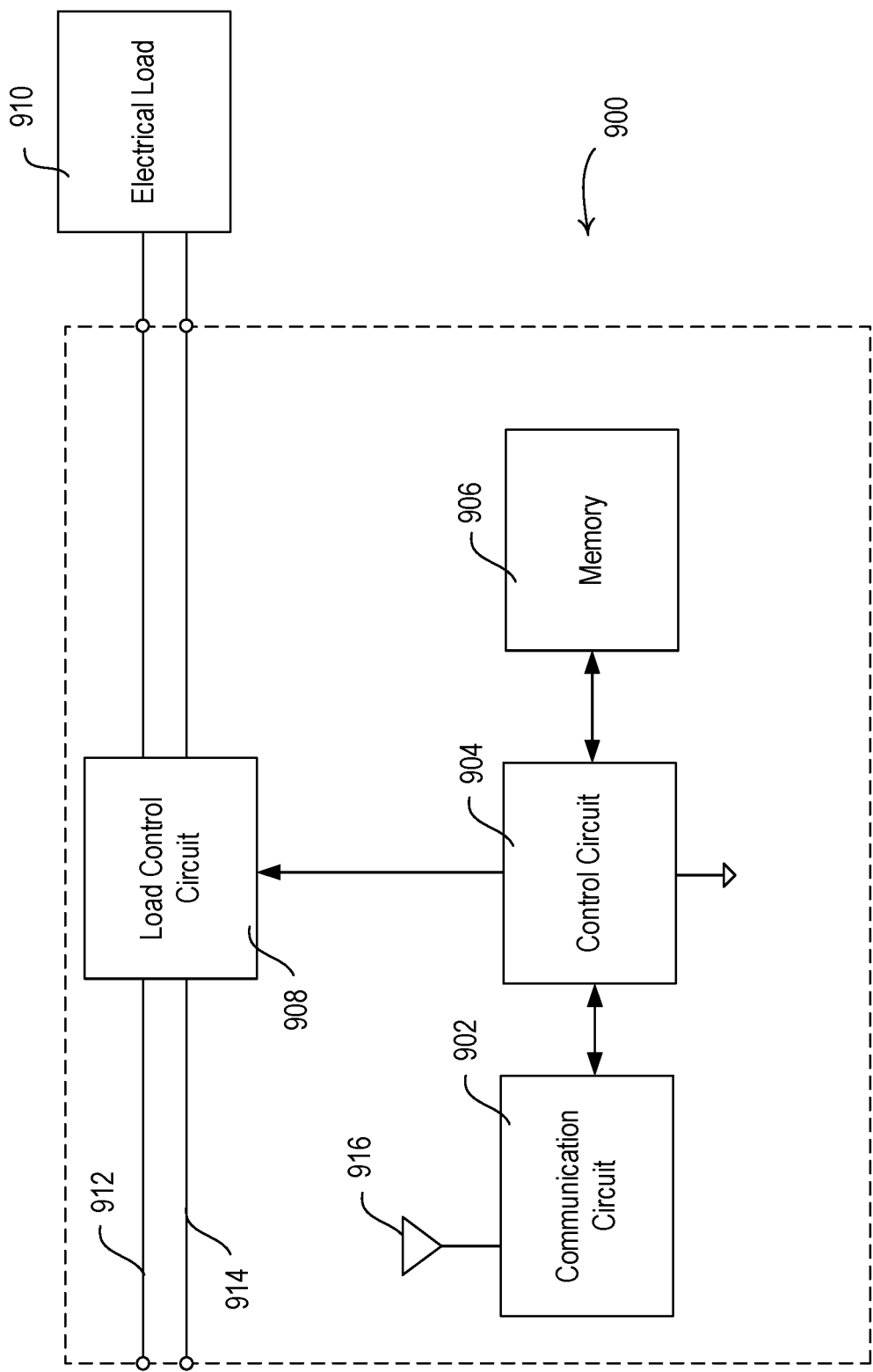
FIG. 9 is a block diagram illustrating an example control-target device.

FIG. 9 is a block diagram illustrating an example control-target device, such as a load control device 900. The load control device 900 may be a control-target device, such as a lighting control device, for example. The load control device 900 may be a dimmer switch, an electronic switch, an electronic ballast for lamps, an LED driver for LED light sources, a plug-in load control device, a temperature control device (e.g., a thermostat), a motor drive unit for a motorized window treatment, or other load control device. The load control device 900 may include a communication circuit 902. The communication circuit 902 may include a receiver, an RF transceiver, or other communication module capable of performing wired and/or wireless communications. The wireless communications may be performed via an antenna 916.

The communication circuit 902 may be in communication with a control circuit 904. The control circuit 904 may include one or more general purpose processors, special purpose processors, conventional processors, digital signal processors (DSPs), microprocessors, integrated circuits, a programmable logic device (PLD), application specific integrated circuits (ASICs), or the like. The control circuit 904 may perform signal coding, data processing, power control, input/output processing, or any other functionality that enables the load control device 900 to perform as described herein.

The control circuit 904 may store information in and/or retrieve information from a memory 906. For example, the memory 906 may maintain association information, control configuration information, and/or other executable instructions for performing as described herein. The memory 906 may include a non-removable memory and/or a removable memory. The load control circuit 908 may receive instructions from the control circuit 904 and may control the electrical load 910 based on the received instructions. The load control circuit 908 may receive power via the hot connection 912 and the neutral connection 914 and may provide an amount of power to the electrical load 910. The electrical load 910 may include a lighting load, an electrical motor for controlling a motorized window treatment, or any other type of electrical load.

Figure 10:
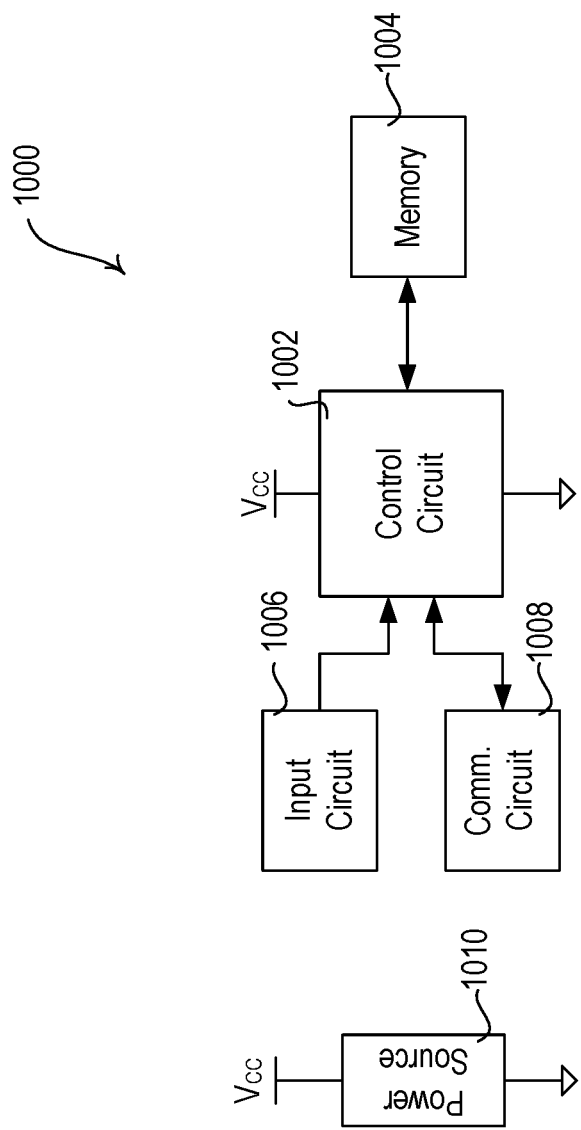
FIG. 10 is a block diagram illustrating an example control-source device.

FIG. 10 is a block diagram illustrating an example control-source device 1000 as described herein. The control-source device 1000 may be a remote control device, an occupancy sensor, a daylight sensor, a window sensor, a temperature sensor, or another control-source device. The control-source device 1000 may include a control circuit 1002 for controlling the functionality of the control-source device 1000. The control circuit 1002 may include one or more general purpose processors, special purpose processors, conventional processors, digital signal processors (DSPs), microprocessors, integrated circuits, a programmable logic device (PLD), application specific integrated circuits (ASICs), or the like. The control circuit 602 may perform signal coding, data processing, power control, input/output processing, or any other functionality that enables the control-source device 1000 to perform as described herein.

The control circuit 1002 may store information in and/or retrieve information from the memory 1004. The memory 1004 may include a non-removable memory and/or a removable memory, as described herein.

The control-source device 1000 may include a communications circuit 1008 for transmitting and/or receiving information. The communications circuit 1008 may transmit and/or receive information via wired and/or wireless communications. The communications circuit 1008 may include a transmitter, an RF transceiver, or other circuit capable of performing wired and/or wireless communications. The communications circuit 1008 may be in communication with control circuit 1002 for transmitting and/or receiving information.

The control circuit 1002 may also be in communication with an input circuit 1006. The input circuit 606 may include an actuator (e.g., one or more buttons) or a sensor circuit (e.g., an occupancy sensor circuit, a daylight sensor circuit, or a temperature sensor circuit) for receiving input that may be sent to a device for controlling an electrical load. For example, the control-source device 1000 may receive input from the input circuit 1006 to put the control circuit 1002 in an association mode and/or communicate association messages from the controller device. The control circuit 1002 may receive information from the input circuit 1002 (e.g. an indication that a button has been actuated or sensed information). Each of the modules within the control-source device 1000 may be powered by a power source 1010.

Although features and elements are described above in particular combinations, each feature or element can be used alone or in any combination with the other features and elements. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

The invention claimed is:

1. A load control system, comprising:
   a control-target device configured to control an electrical load;
   at least two control-source devices for sending control instructions to the control-target device, wherein each control-source device has been associated with the control-target device; and
   a system controller configured to:
   determine that a message has been sent by at least one of the control-source devices directly to the control-target device, wherein the message is an association message or a message comprising control instructions; and
   determine to update information stored at the system controller without querying the control-target device based on the message.

2. The load control system of claim 1, wherein the electrical load is associated with one or more of a lighting system, a heating and air conditioning (HVAC) system, or a motorized window shade system.

3. The load control system of claim 1, wherein the message is an association message from a first control-source device of the at least two of the control-source devices to the control-target device, wherein the association message comprises updated association information.

4. The load control system of claim 3, wherein the system controller is further configured to independently associate the control-target device with the first control-source device and store the updated association information locally.

5. The load control system of claim 4, wherein the system controller is configured to associate the first control-source device and the control-target device without requesting association information from the control-target device.

6. The load control system of claim 3, wherein the system controller is further configured to send the updated association information to the control target device.

7. The load control system of claim 3, wherein the updated association information is for a button group of the first control-source devices, wherein the button group represents a command to the control-target device to control the electrical load.

8. The load control system of claim 3, wherein the system controller is further configured to:
   determine that an association message comprising updated association information has been sent by a second control-source device of the at least two of the control-source devices to the control-target device;
   store the updated association information locally; and
   send the updated association information to the control target device.

9. The load control system of claim 1, wherein the message is a digital message comprising control instructions from a first control-source device of the at least two of the control-source devices to the control-target device.

10. The load control system of claim 9, wherein the system controller is further configured to determine how the control-target device will control the electrical load by using stored control configuration information about the control-target device.

11. The load control system of claim 9, wherein the system controller is further configured to track the status of the electrical load using the control instructions.

12. The load control system of claim 11, wherein the system controller is further configured to update the status of the electrical load by storing one or more of a dimming level of a lighting load, a level of a covering material controlled by a motorized window treatment, or a temperature at a temperature control device.

13. The load control system of claim 12, wherein the system controller is configured to update the status of the electrical load without requesting information from the control-target device.

14. The load control system of claim 12, wherein the status of the electrical load is updated from a previous status of the electrical load received from the control-target device.

15. The load control system of claim 14, wherein the previous status of the electrical load was received as one or more of a periodic status message from the control-target device or a response by the control-target device to a status request from the system controller.

16. The load control system of claim 1, further comprising a network device for editing one or more of association information and/or control configuration information stored at the system controller.

17. The load control system of claim 16, wherein the system controller is further configured to send the one or more of edited association information or edited control configuration information to the control-target device.

18. The load control system of claim 16, wherein the system controller is further configured to receive a digital message from the network device that causes the system controller to delete association information associated with one of the at least two control-source devices.

19. The load control system of claim 1, wherein the system controller is further configured to receive a digital message from a first control-source device of the at least two control-source devices and to send a digital message to the control-target device in response.

20. The load control system of claim 19, wherein the received digital message comprises control instructions for the control-target device for controlling the electrical load, and wherein the system controller is further configured to perform a lookup of control-target devices associated with the first control-source device before sending the digital message to the control-target device.

* * * * *